(12) United States Patent
Hirata et al.

(10) Patent No.: US 7,500,356 B2
(45) Date of Patent: Mar. 10, 2009

(54) EXHAUST EMISSION PURIFYING APPARATUS FOR ENGINE

(75) Inventors: Kiminobu Hirata, Ageo (JP); Nobuhiko Masaki, Ageo (JP); Tatsuji Miyata, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 36 days.

(21) Appl. No.: 11/495,643

(22) Filed: Jul. 31, 2006

(65) Prior Publication Data

US 2007/0000240 A1 Jan. 4, 2007

Related U.S. Application Data

(63) Continuation of application No. PCT/JP2005/001531, filed on Feb. 2, 2005.

(30) Foreign Application Priority Data

| Feb. 2, 2004 | (JP) | ............................. 2004-025752 |
| Feb. 2, 2004 | (JP) | ............................. 2004-025786 |
| Mar. 9, 2004 | (JP) | ............................. 2004-065476 |

(51) Int. Cl.
*F01N 3/00* (2006.01)
(52) U.S. Cl. ............................. 60/286; 60/295; 60/297; 60/301; 60/303; 239/104; 239/110; 239/121; 222/149; 222/150; 222/151
(58) Field of Classification Search .................. 60/274, 60/286, 295, 297, 301, 303; 239/104, 110, 239/121; 222/148, 149, 150, 151
See application file for complete search history.

(56) References Cited

U.S. PATENT DOCUMENTS 3,556,734 A * 1/1971 Peterson ..................... 422/171

| 5,116,579 | A | | 5/1992 | Kobayashi et al. |
| 5,140,814 | A | * | 8/1992 | Kreutmair et al. ............. 60/303 |
| 5,176,325 | A | | 1/1993 | Vidusek |
| 5,372,312 | A | | 12/1994 | Vidusek |
| 5,431,893 | A | | 7/1995 | Hug et al. |
| 5,553,783 | A | | 9/1996 | Slavas et al. |
| 5,601,792 | A | * | 2/1997 | Hug et al. .................... 422/169 |
| 5,603,453 | A | | 2/1997 | Weaver et al. |

(Continued)

FOREIGN PATENT DOCUMENTS

DE 19855338 6/2000

(Continued)

*Primary Examiner*—Binh Q. Tran
(74) *Attorney, Agent, or Firm*—McDermott Will & Emery LLP

(57) ABSTRACT

An exhaust emission purifying apparatus for an engine having: a reduction catalytic converter disposed in an exhaust system of the engine, for reductively purifying nitrogen oxides in the exhaust emission with a reducing agent; an injection nozzle for injection-supplying the reducing agent to an exhaust upstream side of the reduction catalytic converter in an exhaust pipe of the exhaust system; and a reducing agent supply device supplying the reducing agent to the injection nozzle, in which a recess portion is formed on an inner wall on a lower portion of the exhaust pipe, by concaving a site to which at least the reducing agent injection-supplied from the injection nozzle is attached, and also, a bottom wall of the recess portion is made detachable.

19 Claims, 14 Drawing Sheets

U.S. PATENT DOCUMENTS

| | | | |
|---|---|---|---|
| 5,605,042 | A | 2/1997 | Stutzenberger |
| 5,606,856 | A | 3/1997 | Linder et al. |
| 5,832,720 | A * | 11/1998 | Svahn .................. 60/274 |
| 5,884,475 | A | 3/1999 | Hofmann et al. |
| 5,974,789 | A | 11/1999 | Mathes et al. |
| 5,992,141 | A | 11/1999 | Berriman et al. |
| 6,041,594 | A | 3/2000 | Brenner et al. |
| 6,050,088 | A | 4/2000 | Brenner |
| 6,098,896 | A | 8/2000 | Haruch |
| 6,167,698 | B1 | 1/2001 | King et al. |
| 6,260,353 | B1 | 7/2001 | Takahashi |
| 6,279,603 | B1 * | 8/2001 | Czarnik et al. ............ 137/339 |
| 6,382,600 | B1 | 5/2002 | Mahr |
| 6,513,323 | B1 * | 2/2003 | Weigl et al. ............... 60/286 |
| 6,755,017 | B2 | 6/2004 | Katashiba et al. |
| 6,814,303 | B2 * | 11/2004 | Edgar et al. ............... 239/128 |
| 6,912,846 | B2 | 7/2005 | Huber et al. |
| 2004/0045284 | A1 | 3/2004 | Ripper et al. |

FOREIGN PATENT DOCUMENTS

| | | |
|---|---|---|
| DE | 19946901 | 4/2001 |
| DE | 10060808 | 7/2002 |
| EP | 0886043 | 12/1998 |
| JP | 64000311 | 1/1989 |
| JP | 2173311 | 7/1990 |
| JP | 2218418 | 8/1990 |
| JP | 02-223624 | 9/1990 |
| JP | 2-223625 | 9/1990 |
| JP | 03-129712 | 6/1991 |
| JP | 03-242415 | 10/1991 |
| JP | 04-237860 | 8/1992 |
| JP | 04-292565 | 10/1992 |
| JP | 05-171921 | 7/1993 |
| JP | 05-222923 | 8/1993 |
| JP | 05-302509 | 11/1993 |
| JP | 06-007643 | 1/1994 |
| JP | 07-127503 | 5/1995 |
| JP | 07-279650 | 10/1995 |
| JP | 8-193511 | 7/1996 |
| JP | 8-210124 | 8/1996 |
| JP | 9-509890 | 10/1997 |
| JP | 9-511807 | 11/1997 |
| JP | 11-294145 | 10/1999 |
| JP | 2000-027627 | 1/2000 |
| JP | 2000-257419 | 9/2000 |
| JP | 2000-314308 | 11/2000 |
| JP | 2001-020724 | 1/2001 |
| JP | 2001-027112 | 1/2001 |
| JP | 2001-050035 | 2/2001 |
| JP | 2001-173431 | 6/2001 |
| JP | 2001-523165 | 11/2001 |
| JP | 2002-004840 | 1/2002 |
| JP | 2002-30927 | 1/2002 |
| JP | 2002-097940 | 4/2002 |
| JP | 2002-155732 | 5/2002 |
| JP | 2002-513109 | 5/2002 |
| JP | 2002-188431 | 7/2002 |
| JP | 2002-221024 | 8/2002 |
| JP | 2002-531743 | 9/2002 |
| JP | 2002-332825 | 11/2002 |
| JP | 2003-010644 | 1/2003 |
| JP | 2003-239727 | 8/2003 |
| JP | 2003-260332 | 9/2003 |
| JP | 2003-328734 | 11/2003 |
| JP | 2004-04405 | 2/2004 |
| JP | 2004-044405 | 2/2004 |
| WO | WO 96-08639 | 3/1996 |
| WO | WO 99-30811 | 6/1999 |
| WO | WO 99-55445 | 11/1999 |
| WO | WO 03-018177 | 3/2003 |

* cited by examiner

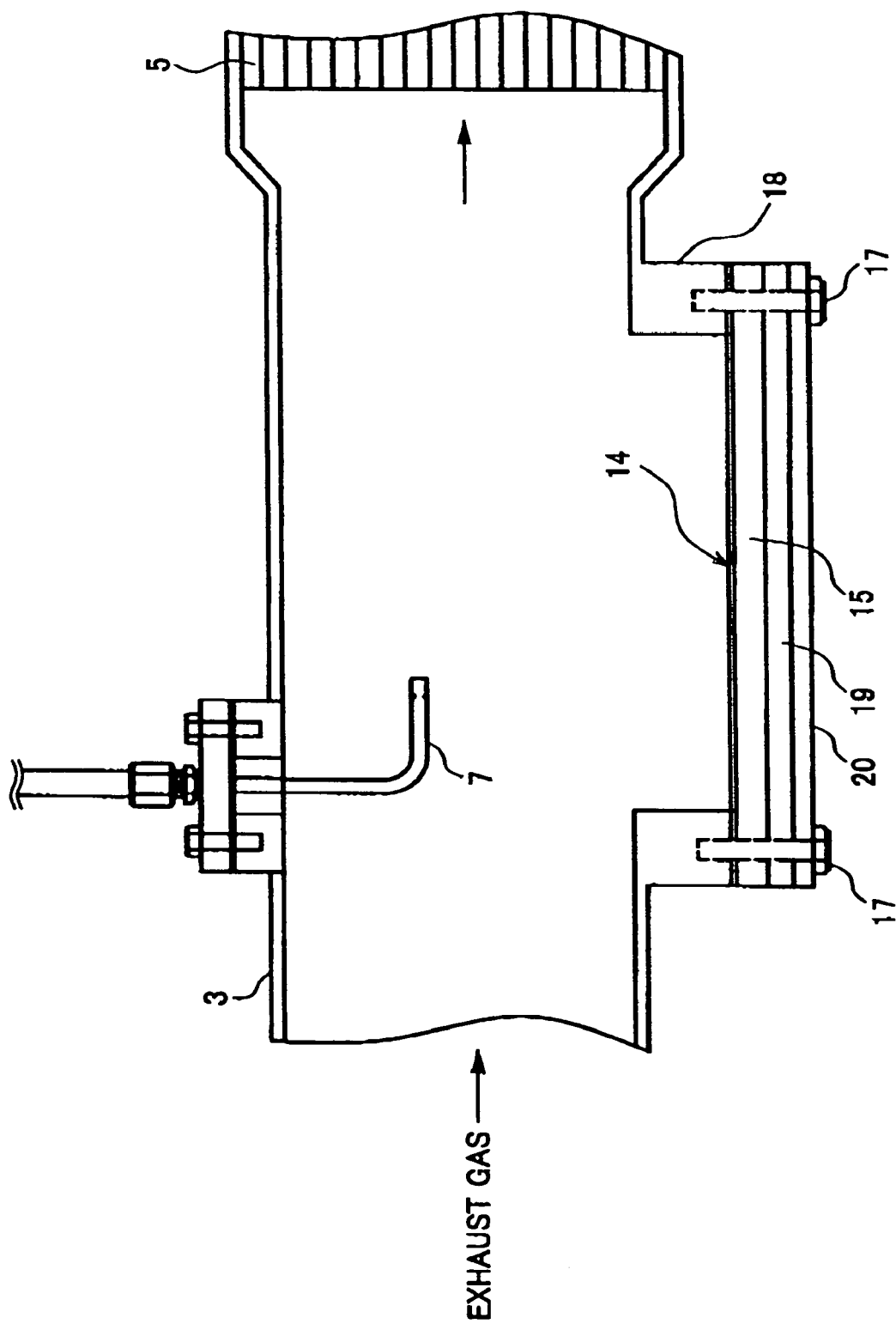

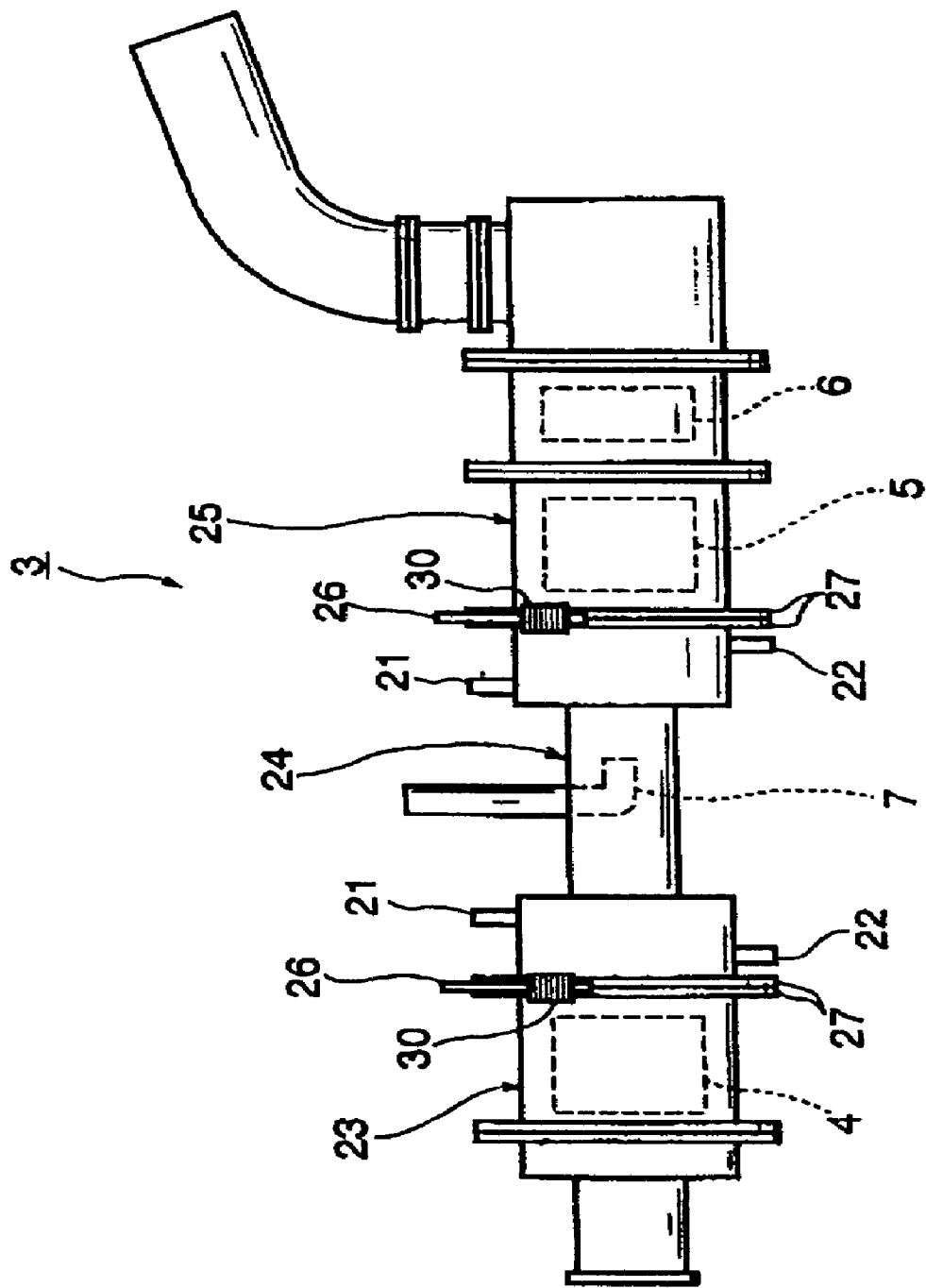

EXHAUST EMISSION PURIFYING APPARATUS FOR ENGINE

This application is a continuation of PCT/JP2005/001531, filed on Feb. 2, 2005.

BACKGROUND OF THE INVENTION

1. Field of the Invention

The present invention relates to an exhaust emission purifying apparatus adapted for Use in purifying exhaust emission from a diesel engine, a gasoline engine or the like, mounted on an on-moving vehicle by supplying a reducing agent to the flow of exhaust emission on an upstream side of a reduction catalytic converter in an exhaust passage of the engine, to thereby reductively eliminate nitrogen oxides ($NO_x$) emitted from the engine. More particularly, it relates to an exhaust emission purifying apparatus for an engine capable of removing a component of a reducing agent, which is deposited in an exhaust passage as a result that the supplied reducing agent is attached to or deposited on the inside of the exhaust passage

2. Description of the Related Art

Several types of exhaust emission purifying apparatuses has been proposed respectively formed as an on-moving vehicle emission cleaning system for cleaning the exhaust emission by eliminating especially $NO_x$ in harmful substances in the exhaust emission exhausted from an engine on the vehicle. In this exhaust emission purifying apparatus, a reduction catalytic converter is disposed in an exhaust passage of the engine, and a reducing agent is supplied by injection into the exhaust passage on an upstream side of the reduction catalytic converter, so that $NO_x$ in the exhaust emission and the reducing agent are subjected to the catalytic-reduction reaction to each other, thereby purifying $NO_x$ by conversion into a harmless component. The reducing agent is stored in a storage tank in a liquid state at the room temperature, and a necessary amount thereof is injection-supplied from an injection nozzle. For the reduction reaction, ammonia having good reactivity to $NO_x$ is used, and as the reducing agent, the urea aqueous solution, which is hydrolyzed to readily generate ammonia, the ammonia aqueous solution or other reducing agent aqueous solution, is used (refer to Japanese Unexamined Patent Publication No. 2000-27627, indicated below).

In the above-described conventional exhaust emission purifying apparatus, an amount of the reducing agent, for example the urea aqueous solution (to be referred to as "urea water"), to be injection-supplied to the exhaust passage, is controlled according to engine operating conditions, such as an exhausting amount of $NO_x$, the exhaust emission temperature and the like. However, depending on the exhaust emission temperature, urea in the supplied urea water may be deposited at the periphery of the injection nozzle, in a muffler diffusion chamber and the like, in the exhaust passage. In such a case, there is a possibility that the exhaust emission pressure of the engine rises resulting in a degradation of engine power or in a degradation of fuel consumption. Further, also in the case where light oil or gasoline being a fuel, or alcohol, is used as the reducing agent, similarly to the above, a component such as carbon or the like may be deposited in the exhaust passage, resulting in a possibility of the degradation of engine power or the degradation of fuel consumption.

Accordingly, in the case where the reducing agent component is deposited in the exhaust passage as described in the above, it is necessary to remove the reducing agent component. However, in the conventional technology, it has been difficult to readily accomplish the removal.

SUMMARY OF THE INVENTION

Therefore, in view of the above problem, the present invention has an object to provide an exhaust emission purifying apparatus for an engine, capable of removing the reducing agent component, which is deposited in the exhaust passage, when the reducing agent supplied to the exhaust upstream side of the reduction catalytic converter is attached to the inside of the exhaust passage.

In order to achieve the above object, an exhaust emission purifying apparatus for an engine according to a first aspect of the present invention, comprises: a reduction catalytic converter disposed in an exhaust system of the engine, for reductively purifying nitrogen oxides in the exhaust emission with a reducing agent; an injection nozzle for injection-supplying the reducing agent to an upstream side of a flow of exhaust emission with respect to the reduction catalytic converter within an exhaust passage of the exhaust system; and a reducing agent supply device which supplies the reducing agent to the injection nozzle, and the apparatus is provided with a configuration such that the exhaust passage is provided, in an inner wall of a lower portion thereof, with a recessed portion by concaving a given site to which at least the reducing agent injection-supplied from the injection nozzle is attached, and also, the recess portion has a bottom wall thereof configured to be detachably assembled.

According to the above configuration, the component deposited from the reducing agent is accumulated on the recess portion which is formed on the inner wall at the lower portion of the exhaust passage by concaving the given site to which the reducing agent injection-supplied from the injection nozzle is attached, and also, the bottom wall of the recess portion is arranged to be detachably assembled.

Further, the recess portion has a width thereof taken in a horizontal direction along an axial direction of the exhaust passage, and the width is substantially the same as a width of the exhaust passage taken in a horizontal direction.

Furthermore, a bent portion arranged to extend substantially vertically downward along an exhaust emission flow direction and thereafter to be bent toward a substantially horizontal direction is disposed to an exhaust passage portion extending between the injection nozzle and the reduction catalytic converter, and also, the recess portion is formed by concaving an inner wall of the lower portion of the bent portion. As a result, the reducing agent injected from the injection nozzle is flown together with the exhaust emission toward the recess portion formed by concaving the inner wall of the lower portion of the bent portion.

Still further, on the bottom wall of the recess portion, a heater is provided for heating the bottom wall up to at least a fusion point or above of a component of the reducing agent. As a result, the bottom wall is heated up to at least the fusion point or above of the component of the reducing agent by the heater disposed on the bottom wall of the recess portion.

Then, on an outer face side of the heater, a thermal insulating material is disposed for suppressing heat radiation from the heater to the atmosphere. As a result, the heat radiation from the heater to the atmosphere is suppressed by the thermal insulating material disposed on the outer face side of the heater.

Further, an exhaust emission purifying apparatus for an engine according to a second aspect of the present invention, comprises: a reduction catalytic converter disposed in an exhaust system of the engine, for reductively purifying nitrogen oxides in the exhaust emission with a reducing agent; an injection nozzle for injection-supplying the reducing agent to an upstream side of a flow of exhaust emission with respect to the reduction catalytic converter within an exhaust passage of the exhaust system; and a reducing agent supply device arranged for supplying the reducing agent to the injection nozzle, and the apparatus is further provided with blocking means detachably disposed for blocking a passage portion located between a portion of the exhaust passage, to which the reducing agent injection-supplied from the injection nozzle is attached, and another portion of the exhaust passage, on which at least the reduction catalytic converter is disposed, and a feed port for feeding washing water and a drain port for drainage of the washing water are provided on a wall portion of the exhaust passage at the portion to which the reducing agent is attached.

According to the above configuration, the exhaust passage is blocked at the passage portion thereof by the blocking means, which is detachably disposed between the portion of the exhaust passage, to which the reducing agent injection-supplied from the injection nozzle is attached, and the portion of the exhaust passage, on which the reduction catalytic converter is disposed, and the washing water is fed from the feed port and drained from the drain port, which ports are disposed on the wall portion of the exhaust passage at the portion to which the reducing agent is attached.

Further, the blocking means may be disposed on each of an upstream side position of the flow of exhaust emission and a downstream side position of the exhaust emission flow with the injection nozzle therebetween in the exhaust system. As a result, the exhaust passage is blocked by the blocking means which are disposed on the positions of the exhaust upstream side and the exhaust downstream side with the injection nozzle therebetween.

Furthermore, the blocking means comprised of a partitioning plate which is inserted so as to cross the exhaust passage from an insertion opening portion formed on a part of joining portions at which flanges disposed on a connecting portion on a halfway of the exhaust system are joined together to be opposite to each other, and the partitioning plate is held to be sandwiched between the joining portions of the flanges. As a result, the partitioning plate Inserted from the insertion opening portion formed on the part of joining portions at which the flanges are joined together to be opposite to each other is sandwiched by the joining portions of the flanges, and is able to lie across the exhaust passage while blocking the latter.

Still further, the blocking means may be provided with a lock means disposed in the vicinity of the insertion opening portion of the flange joining portions and latched on outer faces of the flanges to be secured in an inserted state between the flanges. Consequently, the lock means disposed in the vicinity of the insertion opening portion of the flange joining portions and latched on the outer faces of the flanges permits the blocking means to be left secured between the flanges in the inserted state.

Then, the feed port for the washing water is disposed on an upper wall portion of the exhaust passage, and the drain port for the washing water is disposed on a bottom wall portion of the exhaust passage. Therefore, the washing water is fed from the feed port disposed on the upper wall portion of the exhaust passage, and is drained from the drain port disposed on the bottom wall portion of the exhaust passage.

Moreover, an exhaust emission purifying apparatus for an engine according to a third aspect of the present invention, comprises: a reduction catalytic converter disposed in an exhaust system of the engine, for reductively purifying nitrogen oxides in the exhaust emission with a reducing agent; an injection nozzle for injection-supplying the reducing agent to an upstream side of a flow of exhaust emission with respect to the reduction catalytic converter within an exhaust passage of the exhaust system; and a reducing agent supply device arranged to supply the reducing agent to the injection nozzle, and the apparatus is additionally provided with a detachable structure formed in the exhaust passage at a portion thereof to which the reducing agent injection-supplied from the injection nozzle is attached.

According to the above configuration, the portion to which the reducing agent is attached in the exhaust passage, when the reducing agent is injection-supplied from the injection nozzle for injection-supplying the reducing agent to the upstream side of the reduction catalytic converter in the exhaust emission flow, is structured to be detachably assembled.

Here, the portion to which the reducing agent is attached in the exhaust passage may be configured by the injection nozzle, which is arranged to be mounted on but detachable from the exhaust passage. As a result, the injection nozzle in itself which directly injects the reducing agent may be freely detached from the exhaust passage.

Further, the portion to which the reducing agent is attached in the exhaust passage may be a given portion of the exhaust passage, which extends by a predetermined length from the vicinity of the injection nozzle on the downstream side of the exhaust emission flow, this given portion of the exhaust passage may be configured to be detachably assembled. As a result, the above-mentioned given portion of the exhaust passage having the predetermined length, to which the reducing agent is susceptible to be attached in the vicinity of the exhaust downstream side of the injection nozzle, is made detachable.

Furthermore, the portion to which the reducing agent is attached in the exhaust passage, may be a given portion of the exhaust passage, which extends from the vicinity of the injection nozzle on the downstream side of the exhaust emission flow to the vicinity of an inlet portion of the reduction catalytic converter, this portion of the exhaust passage may be configured to be detachably assembled. As a result, the portion of the exhaust passage, upon which the reducing agent comes to impinge, to thereby be eventually attached to the inlet portion of the reduction catalytic converter on the exhaust downstream side of the injection nozzle, is arranged to be detachably assembled.

Still further, the portion to which the reducing agent is attached in the exhaust passage may be a given portion of the exhaust passage, which extends by a predetermined length on an exhaust downstream side from the vicinity of an exhaust upstream side of the injection nozzle, this portion of the exhaust passage may be arranged to be of a detachable structure. As a result, the portion of the exhaust passage having the predetermined length, to which the reducing agent is susceptible to be attached on the exhaust downstream side from the vicinity of the exhaust upstream side of the injection nozzle, is arranged to be detachably assembled.

Still further, the portion to which the reducing agent is attached in the exhaust passage may be a given portion of the exhaust passage, which extends from the vicinity of the exhaust upstream side of the injection nozzle to the vicinity of the inlet portion of the reduction catalytic converter, this portion of the exhaust passage may be configured to be detachable. As a result, the portion of the exhaust passage, upon which the reducing agent readily comes to impinge, to thereby be attached to the inlet portion of the reduction catalytic converter on the exhaust downstream side from the vicinity of the exhaust upstream side of the injection nozzle, is configured to be detachably assembled.

Still further, the injection nozzle may be arranged to be detachable from the portion of the exhaust passage that is arranged per se to be detachable. As a result, the injection nozzle in itself can be dismounted from the detached portion of the exhaust passage.

Moreover, there may be disposed a deposition detecting means for detecting that the reducing agent supplied from the injection nozzle to the inside of the exhaust passage is attached to the inside of the exhaust passage to be deposited, and alarm means for alarming of the attachment deposition of the reducing agent based on a detection signal from the deposition detecting means. As a result, it is detected by the deposition detecting means that the reducing agent supplied from the injection nozzle to the inside of the exhaust passage is deposited to be attached to the inside of the exhaust passage, and the detection signal from the deposition detecting means is inputted so that the attachment deposition of the reducing agent is informed as an alarm issued by the alarm means.

Furthermore, the deposition detecting means may be comprised of a unit for measuring an exhaust emission pressure difference between the upstream side of the injection nozzle along the exhaust emission flow and a downstream side of a site where the reducing agent is attached to be deposited on the exhaust downstream side of the injection nozzle, to thereby detect the attachment of the reducing agent due to deposition thereof. As a result, the exhaust emission pressure difference between the exhaust upstream side of the injection nozzle and the downstream side of the site where the reducing agent is attached to be deposited is measured, and when the measured differential pressure reaches a fixed value or above, it is detected that the reducing agent is attached to be deposited.

According to the exhaust emission purifying apparatus for the engine in claim 1, since the recess portion is formed on the inner wall at the lower portion of the exhaust passage, by concaving the site to which at least the reducing agent injection-supplied from the injection nozzle is attached, the reducing agent of large particle diameter in the reducing agent injection-supplied from the injection nozzle cannot move with the exhaust emission flow to drop toward the recess portion. Accordingly, even if a component is deposited from the reducing agent, since such a component is accumulated in the recess portion, it becomes hard for the component to influence on the exhaust emission pressure. Further, since the bottom wall of the recess portion is made detachable, it is possible to appropriately detach the bottom wall to readily eliminate the reducing agent component accumulated in the recess portion. As a result, it is possible to suppress an increase of the exhaust emission pressure of the engine to thereby prevent a degradation of engine power and the degradation of fuel consumption.

According to the apparatus in claim 2, the horizontal width of the recess portion along the axial direction of the exhaust passage is substantially equivalent to the horizontal width of the exhaust passage. Therefore, even if the reducing agent is injected by the injection nozzle to be expanded in a horizontal direction, it is possible to suppress that the reducing agent is attached to the site other than the recess portion so that the component thereof is accumulated.

According to the apparatus in claim 3, since the bent portion is disposed to the exhaust passage between the injection nozzle and the reduction catalytic converter, and also the recess portion is formed by concaving the inner wall of the lower portion of the bent portion, the reducing agent injected from the injection nozzle is flown toward the recess portion together with the exhaust emission. Then, the flow of the exhaust emission is stagnated in the recess portion, and therefore, it becomes difficult for the reducing agent of large particle diameter to flow to come out from the recess portion to the downstream. As a result, it is possible to suppress that the reducing agent of large particle diameter is attached to the inside of the exhaust passage on a downstream side of the recess portion so that the component thereof is accumulated.

According to the apparatus in claim 4, it is possible to heat the reducing agent component accumulated on the bottom wall of the recess portion to the fusion point by the heater disposed on the bottom wall of the recess portion. As a result, it is possible to dissolve the reducing agent component, to thereby eliminate it from the bottom wall of the recess portion.

According to the apparatus in claim 5, it is possible to suppress the heat radiation from the heater to the atmosphere with the thermal insulating material to thereby efficiently heat the bottom wall of the recess portion, thereby enabling a decrease of the working energy of the heater.

Further, according to the exhaust emission purifying apparatus for the engine in claim 6, the portion of the exhaust passage, to which the reducing agent is attached, and the portion of the exhaust passage, on which at least the reduction catalytic converter is disposed, are blocked by the blocking means disposed detachably, and the washing water is fed via the feed port to the portion of the exhaust passage, to which the reducing agent is attached, and then, is drained via the drain port therefrom. Therefore, it is possible to wash only the portion of the exhaust passage, to which the reducing agent is attached. Accordingly, it is possible to eliminate the reducing agent component which is deposited in the exhaust passage as a result that the supplied reducing agent is attached to the exhaust passage. As a result, it is possible to suppress the increase of the exhaust emission pressure of the engine to thereby prevent a degradation of engine power and a degradation of fuel consumption. Further, it is also possible to prevent that the fed washing water gets the reduction catalytic converter wet, by attaching the blocking means at the washing time, to thereby prevent the degradation of the reduction catalytic converter.

According to the apparatus in claim 7, the exhaust passage is not only blocked between the portion of the exhaust passage, at which the reducing agent is deposited, and the portion of the exhaust passage, on which the reduction catalytic converter is disposed, but also is blocked at the portion on the exhaust upstream side of the injection nozzle. Therefore, even in the case where an oxidation catalytic converter for generating for example $NO_2$ is disposed in the exhaust passage on the exhaust upstream side of the injection nozzle, it is also possible to prevent that the washing water gets the oxidation catalytic converter wet.

According to the apparatus in claim 8, the blocking means is the partitioning plate inserted to cross the exhaust passage from the insertion opening portion formed on the part of the joining portions joining the flanges which are disposed on the connecting portion in halfway of the exhaust system to be opposite to each other, and therefore, it is possible to make a detachable structure of the blocking means to be simple.

According to the apparatus in claim 9, the blocking means is secured between the flanges in the inserted state, by the lock means which are latched on the outer faces in the vicinity of the insertion opening portion of the flange joining portions. Therefore, when the blocking means is attached or detached, since the lock means may be simply unlatched, an exchange operation of the blocking means becomes easy, and accordingly a washing operation of the exhaust passage becomes easy.

According to the apparatus in claim 10, since the washing water is fed from the feed port disposed on the upper wall portion of the exhaust passage, and then, is drained from the drain port disposed on the bottom wall portion of the exhaust passage, it is possible to easily fill the exhaust passage with the washing water, and also, it is possible to easily discharge all of the washing water. Accordingly, it is possible to effectively perform washing of the inside of the exhaust passage.

Moreover, according to the exhaust emission purifying apparatus for the engine in claim 11, in the case where the reducing agent supplied by the injection nozzle is attached to the inside of the exhaust passage to be deposited, it is possible to detach the portion at which the component of the reducing agent is deposited, without the necessity of detaching the reduction catalytic converter disposed to the exhaust system of the engine. Then, it is possible to easily wash the detached portion with the water or the like, to thereby remove the reducing agent component which is attached to be deposited. Thereafter, since the portion which has been detached to be washed is attached back to the original site so that the exhaust emission pressure of the engine returns normal, it is possible to prevent any degradation of engine power.

According to the apparatus in claim 12, it is possible to detach the injection nozzle in itself which directly injects the reducing agent, as the portion of the exhaust passage, to which the reducing agent is attached. Then, it is possible to easily wash the detached injection nozzle, to thereby remove the reducing agent attached to the nozzle tip end portion or the like.

According to the apparatus in claim 13, it is possible to detach the portion of the exhaust passage having the predetermined length, at which the reducing agent is susceptible to be deposited in the vicinity of the exhaust downstream side of the injection nozzle, as the portion of the exhaust passage, to which the reducing agent is attached. Then, it is possible to easily wash the detached portion of the exhaust passage having the predetermined length, to thereby remove the reducing agent attached to the exhaust passage.

According to the apparatus in claim 14, it is possible to detach the portion of the exhaust passage, with which the reducing agent is susceptible to impingement to be deposited in the vicinity of the inlet portion of the reduction catalytic converter on the exhaust downstream side of the injection nozzle, as the portion of the exhaust passage, to which the reducing agent is attached. Then, it is possible to easily wash the detached portion of the exhaust passage extending to the vicinity of the inlet portion of the reduction catalytic converter, to thereby remove the reducing agent attached to the exhaust passage.

According to the apparatus in claim 15, it is possible to detach the portion of the exhaust passage having the predetermined length, at which the reducing agent is susceptible to be deposited on the exhaust downstream side from the vicinity of the exhaust upstream side of the injection nozzle, as the portion of the exhaust passage, to which the reducing agent is attached. Then, it is possible to easily wash the detached portion of the exhaust passage having the predetermined length, to thereby remove the reducing agent attached to the exhaust passage.

According to the apparatus in claim 16, it is possible to detach the portion of the exhaust passage, upon which the reducing agent comes to impinge to be deposited at the inlet portion of the reduction catalytic converter on the exhaust downstream side from the vicinity of the exhaust upstream side of the injection nozzle, as the portion of the exhaust passage, to which the reducing agent is attached. Then, it is possible to easily wash the detached portion of the exhaust passage extending to the vicinity of the inlet portion of the reduction catalytic converter, to thereby remove the reducing agent attached to the exhaust passage.

According to the apparatus in claim 17, it is possible to detach the injection nozzle in itself from the detachable portion of the exhaust passage. Then, it is possible to easily wash the detached injection nozzle, to thereby remove the reducing agent attached to the nozzle tip end portion or the like.

According to the apparatus in claim 18, it is possible to detect by the deposition detecting means that the reducing agent supplied from the injection nozzle into the exhaust passage is attached to be deposited to the inside of the exhaust passage, and to input with the detection signal to thereby alarm a driver or the like for example of the attachment deposition of the reducing agent by the alarm means. As a result, it is possible to urge the driver or the like to wash the portion of the exhaust passage, at which the reducing agent component is deposited.

According to the apparatus in claim 19, it is possible to measure the exhaust emission pressure difference between the exhaust upstream side of the injection nozzle and the downstream side of the site where the reducing agent is attached to be deposited, to thereby detect the attachment deposition of the reducing agent when the differential pressure reaches the fixed value or above. Thus, it is possible to detect the deposition of the reducing agent component with a simple structure by means of a differential pressure gauge or the like, for example.

BRIEF DESCRIPTION OF THE DRAWINGS

FIG. 4 is a main part explanatory diagram showing another embodiment of the structure in the vicinity of the injection nozzle;

FIG. 5 is an enlarged main part explanatory diagram showing an embodiment of the exhaust emission purifying apparatus for the engine according to a second aspect of the present invention;

DESCRIPTION OF THE PREFERRED EMBODIMENTS

Figure 1:
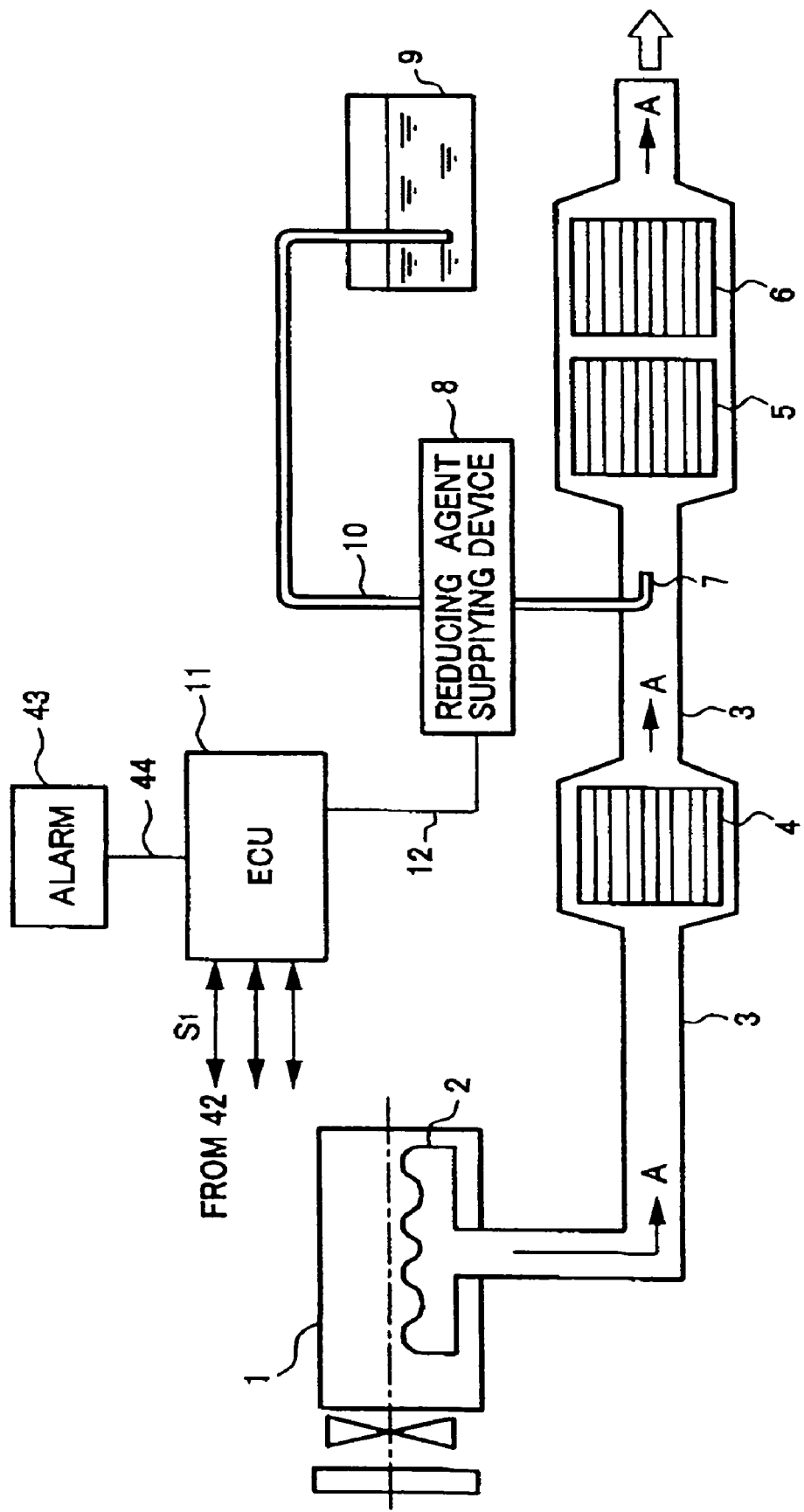
FIG. 1 is a conceptual diagram showing an entire configuration of an exhaust emission purifying apparatus for an engine according to the present invention.

Embodiments of the present invention will be described in detail based on the accompanying drawings hereunder. FIG. 1 is a conceptual diagram showing an entire configuration of an exhaust emission purifying apparatus for an engine according to the present invention. This exhaust emission purifying apparatus is for supplying a reducing agent to an exhaust upstream side of a reduction catalytic converter in an exhaust passage, to reductively eliminate $NO_x$ emitted from a diesel engine, a gasoline engine or the like of on-moving vehicle type. The exhaust emission of an engine 1 which uses gasoline or light oil as fuel thereof passes from an exhaust manifold 2 through an exhaust pipe 3 serving as an exhaust passage, to be discharged into the atmosphere. In detail, in the exhaust pipe 3, there are disposed an oxidation catalytic converter 4 for nitrogen monoxides (NO), a reduction catalytic converter 5 for $NO_x$ and an oxidation catalytic converter 6 for ammonia-slip, in this order from an exhaust upstream side, and further, a temperature sensor, a $NO_x$ sensor and the like are disposed on former and latter stages of these catalytic converters, so that an exhaust system is configured.

The oxidation catalytic converter 4 is for causing a reduction in NO and the like in the exhaust emission which passes through the exhaust pipe 3 by way of the oxidation reaction, and is formed such that a honeycomb type catalyst having a surface formed of a porous material such as alumina on which is supported precious metal such as platinum, is disposed to a monolith type catalyst carrier which is formed of a material having high heat resistance properties and high anti-corrosion characteristics, such as stainless steel, and has a cross section of honeycomb shape. Then, the exhaust emission passing through the exhaust pipe 3 is flown while being in contact with the above oxidation catalytic converter, so that NO component in the exhaust emission is oxidized to become $NO_2$, thereby improving a removal rate of $NO_x$ in the reduction catalytic converter 5 on a downstream side. Incidentally, at the same time of the oxidation reaction of NO, carbon hydride (HC), carbon monoxide (CO) and the like in the exhaust emission are decreased by the oxidation reaction.

The reduction catalytic converter 5 for $NO_x$ is for reductively purifying $NO_x$ in the exhaust emission passing through the exhaust pipe 3 with the reducing agent, and is formed such that an active component of zeolite series is supported on a monolith type catalyst carrier which is formed of cordierite ceramics or a heat-resistance steel of Fe—Cr—Al series for example and has a cross section of honeycomb shape. The active component supported on the catalyst carrier is supplied with the reducing agent to be activated, to thereby effectively purify $NO_x$ in the exhaust emission into harmless substance. Incidentally, on the latter stage of the reduction catalytic converter 5 for $NO_x$, the oxidation catalytic converter 6 for ammonia-slip is disposed.

On an upstream side of the reduction catalytic converter 5 for $NO_x$ inside of the exhaust pipe 3, an injection nozzle 7 is disposed so that the reducing agent is Injection-supplied from a reducing agent supply device 8 into the exhaust pipe 3 together with the pressurized air via the injection nozzle 7. Here, a tip end portion of the injection nozzle 7 is formed to extend toward the downstream side in substantially parallel to a flow direction A of the exhaust emission. However, the tip end portion of the injection nozzle 7 may be formed to protrude substantially in perpendicular to the flow direction "A" of the exhaust emission in the exhaust pipe 3. Further, to the reducing agent supply device 8, the reducing agent stored in a storage tank 9 is supplied via supply piping 10.

In this embodiment, the urea aqueous solution (urea water) is used as the reducing agent which is injection-supplied by the injection nozzle 7. Other than the urea water, the ammonia aqueous solution or the like may be used as the reducing agent. Then, the urea water injection-supplied by the injection nozzle 7 is hydrolyzed due to the exhaust heat in the exhaust pipe 3, to thereby easily generate ammonia. Obtained ammonia reacts to $NO_x$ in the exhaust emission at the reduction catalytic converter 5 for $NO_x$, to be purified into the water and the harmless gas. The urea water is the aqueous water of solid or powdered urea, and is stored in the storage tank 9, to be supplied to the reducing agent supply device 8 via the supply piping 10.

To the reducing agent supply device 8, an ECU (Engine Control Unit) 11 as a control circuit consisting of a CPU for example is connected via a signal line 12, and an operation of the reducing agent supply device 8 is controlled based on a control signal supplied from the ECU 11, so that the supply of the reducing agent from the injection nozzle 7 is controlled.

In the exhaust emission purifying apparatus configured as in the above, an operation of supplying the reducing agent (urea water) to the exhaust upstream side of the reducing catalytic converter 5 will be described. Firstly, the exhaust emission generated due to an operation of the engine 1 passes, from the exhaust manifold 2 via the exhaust pipe 3, through the oxidation catalytic converter 4, and the reduction catalytic converter 5 for $NO_x$, and further the oxidation catalytic converter 6 for ammonia-slip, which are disposed on halfway of the exhaust pipe 3, to be discharged to the atmosphere via an end portion exhaust opening of the exhaust pipe 3. At this time, in the exhaust pipe 3, the urea water is injected by the injection nozzle 7 disposed on the exhaust upstream side of the reduction catalytic converter 5 for $NO_x$. The urea water is supplied to the reducing agent supply device 8 via the supply piping 10 from the urea water storage tank 9, and is injection-supplied by the injection nozzle 7 together with the pressurized air into the exhaust emission by the operation of the reducing agent supply device 8.

Thereafter, when the operation of the engine 1 is stopped, in order to terminate the injection of the urea water from the injection nozzle 7, firstly, the supply of the urea water from the storage tank 9 is blocked by the operation of the reducing agent supply device 8, and thereafter, only the pressurized air is supplied to the injection nozzle 7 for a certain time. Thus, the urea water is spouted out of a nozzle body and a nozzle hole of the injection nozzle 7, and then, the injection of the urea water is terminated.

Figure 2:
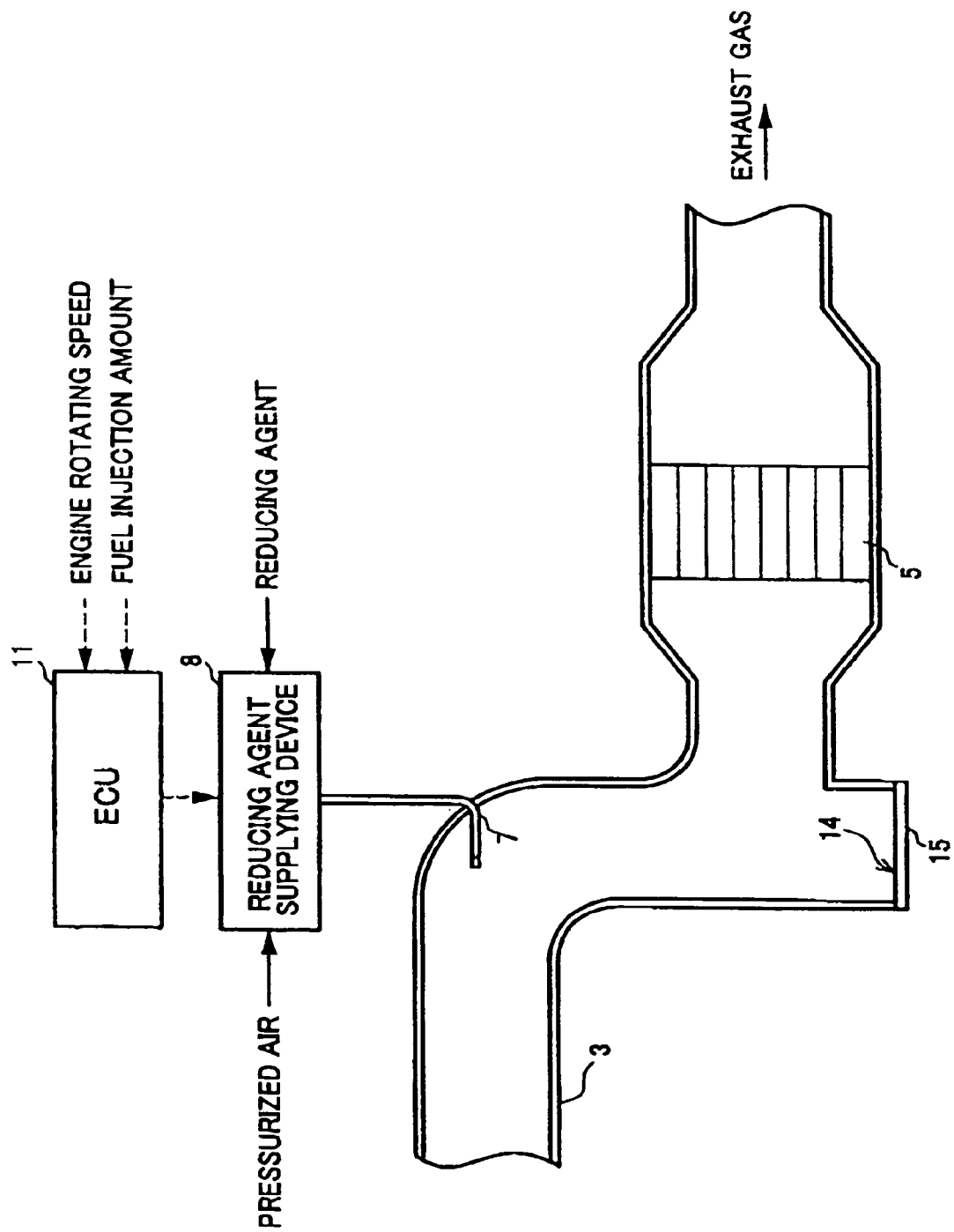
FIG. 2 is an enlarged main part explanatory diagram showing an embodiment of the exhaust emission purifying apparatus for the engine according to a first aspect of the present invention.

FIG. 2 is an enlarged main part explanatory diagram showing an embodiment of the exhaust emission purifying apparatus for the engine according to a first aspect of the present invention. In this embodiment, a given site to which at least the urea water injection-supplied from the injection nozzle 7 is attached, is recessed to form a recessed portion 14 in an inner wall of a lower portion of the exhaust pipe 3, and also, a bottom wall 15 of the recessed portion 14 is arranged to be detachable.

Figure 3:
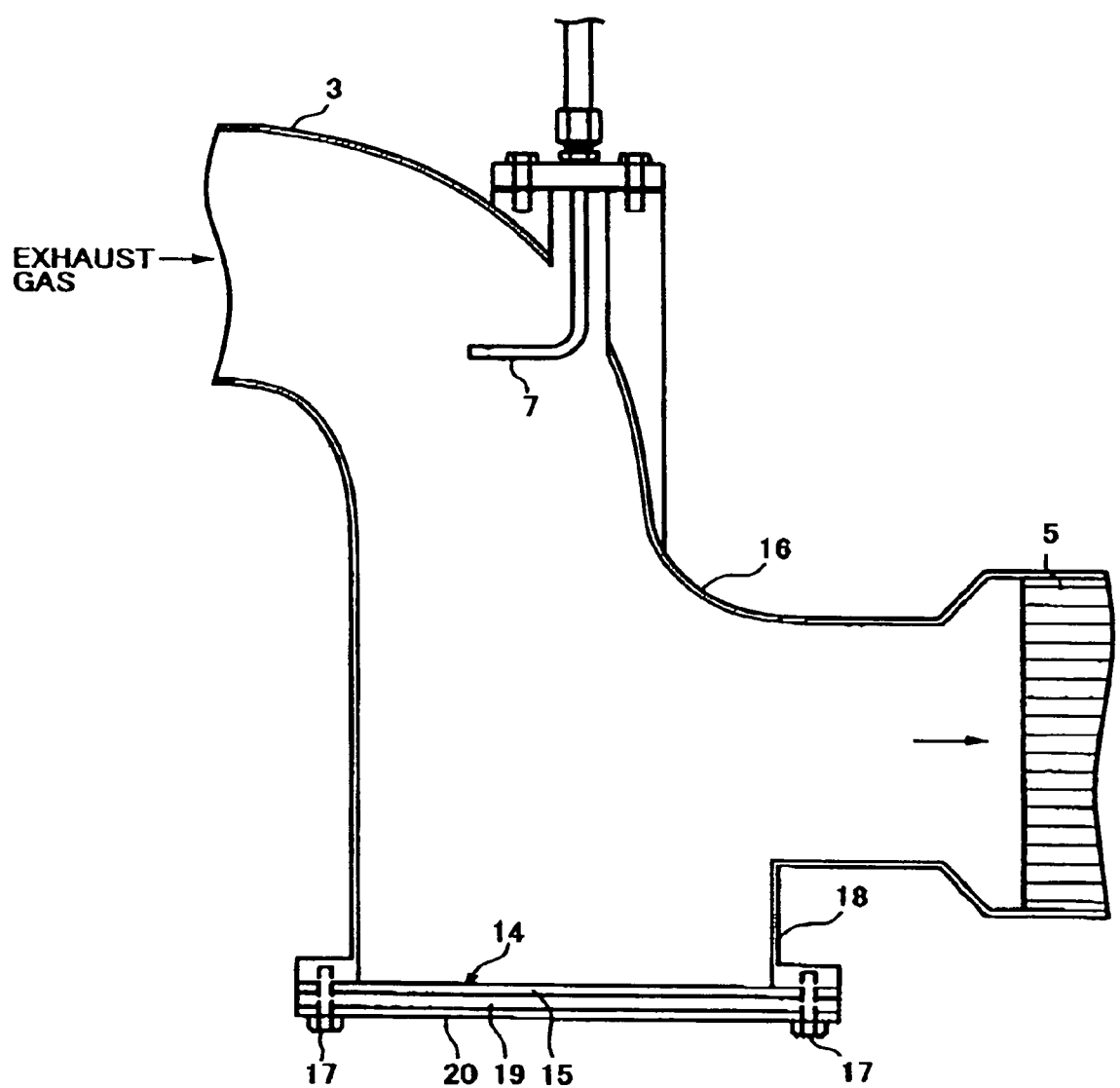
FIG. 3 is a main part explanatory diagram showing a structure in the vicinity of an injection nozzle in the above exhaust emission purifying apparatus.

Then, as shown in FIG. 3, to the exhaust pipe 3 between the injection nozzle 7 and the reduction catalytic converter 5 for $NO_x$, there is disposed a bent portion 16 formed to extend downward in substantially vertical direction along an exhaust emission flow direction and thereafter is bent to a substantially horizontal direction. Then, in a lower inner wall of the bent portion 16, the given site to which at least the urea water injection-supplied from the injection nozzle 7 is attached, is recessed, to thereby form the recess portion 14. The horizontal width of the recess portion 14 along an axial direction of the exhaust pipe 3 is arranged to be substantially equivalent to the horizontal width of the exhaust pipe 3. Further, the bottom wall 15 of the recess portion 14 is detachably attached to a side wall 18 of the recess portion 14 by means of screw bolts 17 or the like.

On a lower face of the bottom wall 15 of the recess portion 14, there is disposed a heater 19 for heating the bottom wall 15 up to at least a fusion point of urea or above. Further, on an outer side face of the heater 19, a thermal insulating material 20 covering at least a lower face of the heater 19 is disposed for suppressing the heat radiation to the atmosphere from the heater 19.

According to the above configuration, the exhaust emission of the engine 1 passes through the exhaust pipe 3, to be led to the reduction catalytic converter 5 for $NO_x$. At this time, the ECU shown in FIG. 2 controls the operation of the reducing agent supply device 8, based on a rotation speed of the engine 1 and a fuel injection amount thereof, so that the urea water of amount corresponding to engine operating conditions passes through the piping together with the pressurized air, to be injected from the injection nozzle 7 into the exhaust pipe 3 on the exhaust upstream side of the reduction catalytic converter 5 for $NO_x$. The urea water injected from the injection nozzle 7 is hydrolyzed due to the exhaust heat of the engine 1 and the water vapor in the exhaust emission, and passes through the bent portion 16 together with the exhaust emission while generating ammonia, to be flown into the reduction catalytic converter 5 for $NO_x$. Then, in the reduction catalytic converter 5 for $NO_x$, ammonia and $NO_x$ in the exhaust emission react to each other, so that $NO_x$ in the exhaust emission is purified into the water and the harmless gas.

At this time, since the recess portion 14 is formed on the inner wall on the lower portion of the exhaust pipe 3, the urea water having large particle diameter, in the urea water injected from the injection nozzle 7, cannot move with the exhaust emission flow to drop toward the recess portion 14. Accordingly, even if urea is deposited from this urea water, deposited urea is accumulated in the recess portion 14, and therefore, is reluctant to provide an influence on the exhaust emission pressure. Further, the width of the recess portion 14 in a horizontal direction along the axial direction of the exhaust pipe 3 is arranged to be substantially equal to the width of the exhaust pipe 3 in a horizontal direction. Therefore, even if the urea water from the injection nozzle 7 is injected to diffuse in a horizontal direction, it is suppressed that the urea water is attached to the site other than the recess portion 14 and a component thereof is accumulated.

At this stage, since the bent portion 16 is disposed between the injection nozzle 7 and the reduction catalytic converter 5 for NOx, and also, the recess portion 14 is formed on the inner wall on the lower portion of the bent portion 16, the urea water injected from the injection nozzle 7 is flown toward the recess portion 14 together with the exhaust emission. Then, the exhaust emission is stagnated in the recess portion 14, and therefore, the urea water having large particle diameter, in the urea water flown into the recess portion 14, is hard to come out of the recess portion 14 to the downstream. As a result, it is suppressed that the urea water having large particle diameter is attached to the inside of the exhaust pipe 3 on a downstream side of the recess portion 14 so that urea is accumulated. Then, since the bottom wall 15 of the recess portion 14 is arranged to be detachably assembled, it is possible to appropriately detach the bottom wall 15, to easily remove all of the urea accumulated in the recess portion 14.

Furthermore, since the heater 19 is disposed on the bottom wall 15, it is possible to dissolve the urea accumulated on the bottom wall 15, to remove it from an upper wall face of the bottom wall 15. Further, the thermal insulating material 20 is disposed on the outer face side of the heater 19, and therefore, it is possible to efficiently heat the bottom wall 15 by the heater 19, to thereby decrease the working energy of the heater 19. Incidentally, the heater 19 may be controlled to be turned on or off, so that all of urea accumulated on the upper wall face of the bottom wall 15 can be fused at each predetermined time for example.

Note, in FIG. 2 and FIG. 3, the bent portion 16 is disposed to the exhaust pipe 3. However, the present invention is not limited thereto, and as shown in FIG. 4, can be similarly applied to the case where the exhaust pipe 3 at an attachment portion of the injection nozzle 7 extends linearly in a substantially horizontal direction. The site to which at least the urea water injected from the injection nozzle 7 is attached, is recessed, to thereby form, on the inner wall on the lower portion of the exhaust pipe 3, the recess portion 14 of which horizontal width along the axial direction of the exhaust pipe 3 is arranged to be substantially equal to the horizontal width of the exhaust pipe 3. The bottom wall 15 of the recess portion 14 is detachable similarly to the above. Further, similarly to the above, the heater 19 heating the bottom wall 15 of the recess portion 14 and the thermal insulating material 20 covering the outer side face of the heater 19 are disposed.

FIG. 5 is a diagrammatic and explanatory view showing, in enlarged scale, a main part of an embodiment of the exhaust emission purifying apparatus for the engine according to a second aspect of the present invention. In this embodiment, blocking means is detachably disposed for blocking between two parts of the exhaust pipe 3, i.e., a part of the exhaust pipe 3, to which the reducing agent (urea water) injection-supplied from the injection nozzle 7 is attached, and another part of the exhaust pipe, on which at least the reduction catalytic converter 5 is disposed, and further, a feed port 21 and a drain port 22 for the washing water are disposed in the part of the exhaust pipe 3, to which the urea water is attached, and are located on a wall portion of the exhaust pipe 3.

Namely, partitioning plates 26 (refer to FIG. 7) serving as the blocking means are detachably disposed between a first catalyst incorporating muffler 23 with the oxidation catalytic converter 4 disposed therein and a partial exhaust pipe 24 provided with the injection nozzle 7, and also between the partial exhaust pipe 24 and a second catalyst incorporating muffler 25 with the reduction catalytic converter 5 disposed therein, so that the partial exhaust pipe 24 may be blocked from the first and second catalyst incorporating mufflers 23 and 25.

Figure 6A:
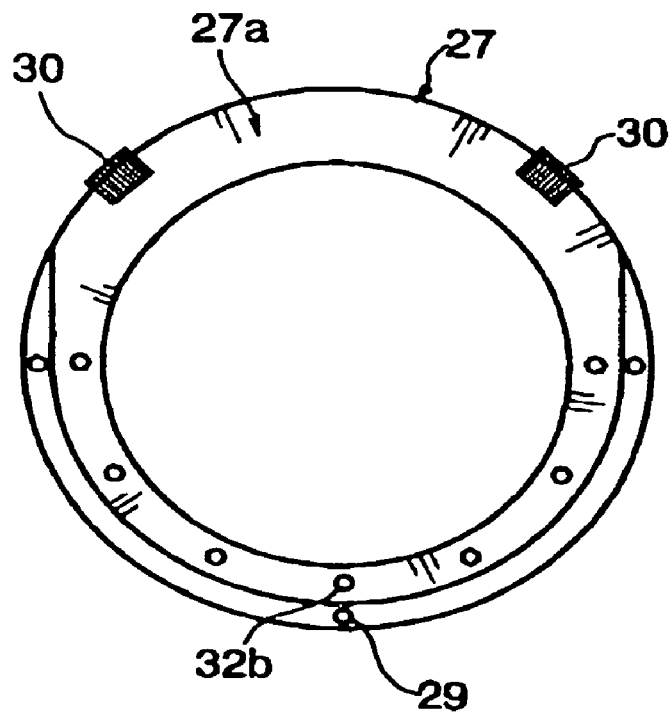
FIG. 6 is an explanatory diagram showing a structure of flanges disposed on a connecting portion in halfway of an exhaust pipe in the above exhaust emission purifying apparatus, in which 6A is a front view and 6B is a center longitudinal section view.
Figure 6B:
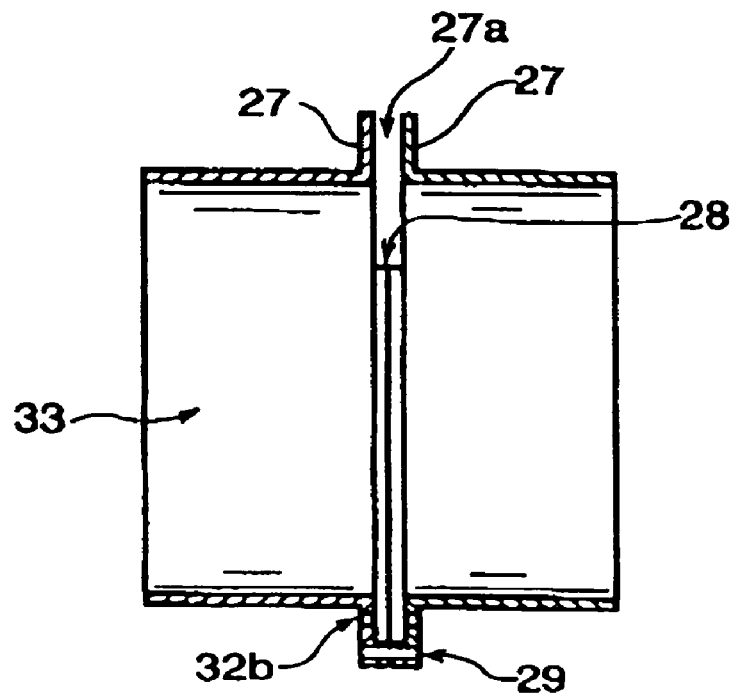

Specifically, as shown in FIG. 5, joining portions each joining flanges 27 and 27 which are disposed on connecting portions of the respective exhaust pipes to be opposite to each other, are disposed between the first catalyst incorporating muffler 23 and the partial exhaust pipe 24, and between the partial exhaust pipe 24 and the second catalyst incorporating muffler 25. As shown in FIG. 6B, the flanges 27 and 27 form, on the joining portion, a clearance portion 28 into which the partitioning plate 26 (refer to FIG. 7) is inserted, and a part of the clearance portion 28 is opened outward to be made an insertion hole portion 27a, so that the partitioning plate 26 is detachably inserted into the clearance portion 28 via the insertion hole portion 27a. Further, as shown in FIG. 6A, each of the flanges 27 is provided with a plurality of connecting holes 29 (for example, three holes) on the periphery thereof, so that the opposite flanges 27 and 27 are tightly connected together via the connecting holes 29 by means of screw bolts and nuts.

Further, on the insertion hole portion 27a of each of the opposite flanges 27 and 27, lock means 30 are disposed. The lock means 30 are latched on an outer side face of the insertion hole portion 27a of each of the flanges 27 to fix the partitioning plate 26 in an inserted state between the joining portion of the opposite flanges 27 and 27.

Then, by fastening the oppositely joined flanges 27 and 27 by means of the screw bolts and nuts between the first catalyst incorporating muffler 23 and the partial exhaust pipe 24, and between the partial exhaust pipe 24 and the second incorporating muffler 25, the first and second catalyst incorporating mufflers 23 and 25, the partial exhaust pipe 24 are coupled integrally to form a single piece of lengthy exhaust pipe 3.

Figure 7:
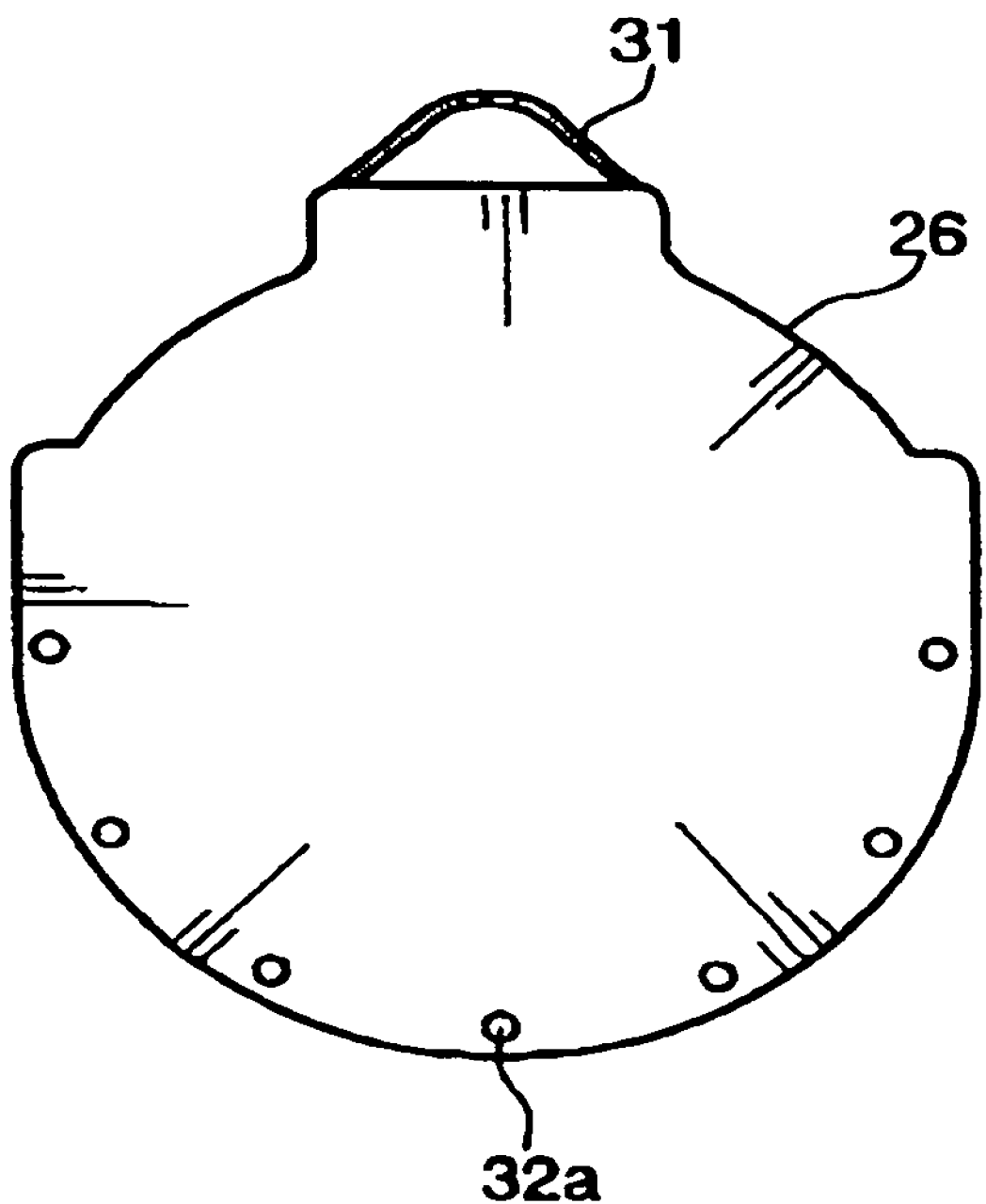
FIG. 7 is a front view showing a shape of a partitioning plate held between joining portions of the flanges.

Into the clearance portion 28 of the oppositely joined flanges 27 and 27, the partitioning plate 26 is detachably inserted as shown in FIG. 5. This insertion of the partitioning plate 26 in the clearance portion 28 is carried out at the washing time to block the halfway of the exhaust pipe 3, to thereby prevent the washing water from leaking out toward the first and second catalyst incorporating mufflers 23 and 25, and is formed in a shape to be completely housed in the clearance portion 28 as shown in FIG. 7. Further, the partitioning plate 26 is provided with a holding portion 31 at an upper end portion thereof, so that the insertion and the detachment of the partitioning plate 26 into and out of the clearance portion 28 are easily performed. Then, on a half circumference portion for example along the periphery of the partitioning plate 26, a plurality of holes 32a (seven holes in FIG. 7) is formed, to thereby form combining holes in cooperation with holes 32b (refer to FIG. 6) formed on the periphery of the flange 27 corresponding to the holes 32a, so that the partitioning plate 26 and the flanges 27 are combined together by means of screw bolts and nuts. Incidentally, the combining holes may be formed over the entire circumference and not on the half circumference portion, and may not be provided and formed in case where the lock means 30 are provided as in the present embodiment.

Figure 8:
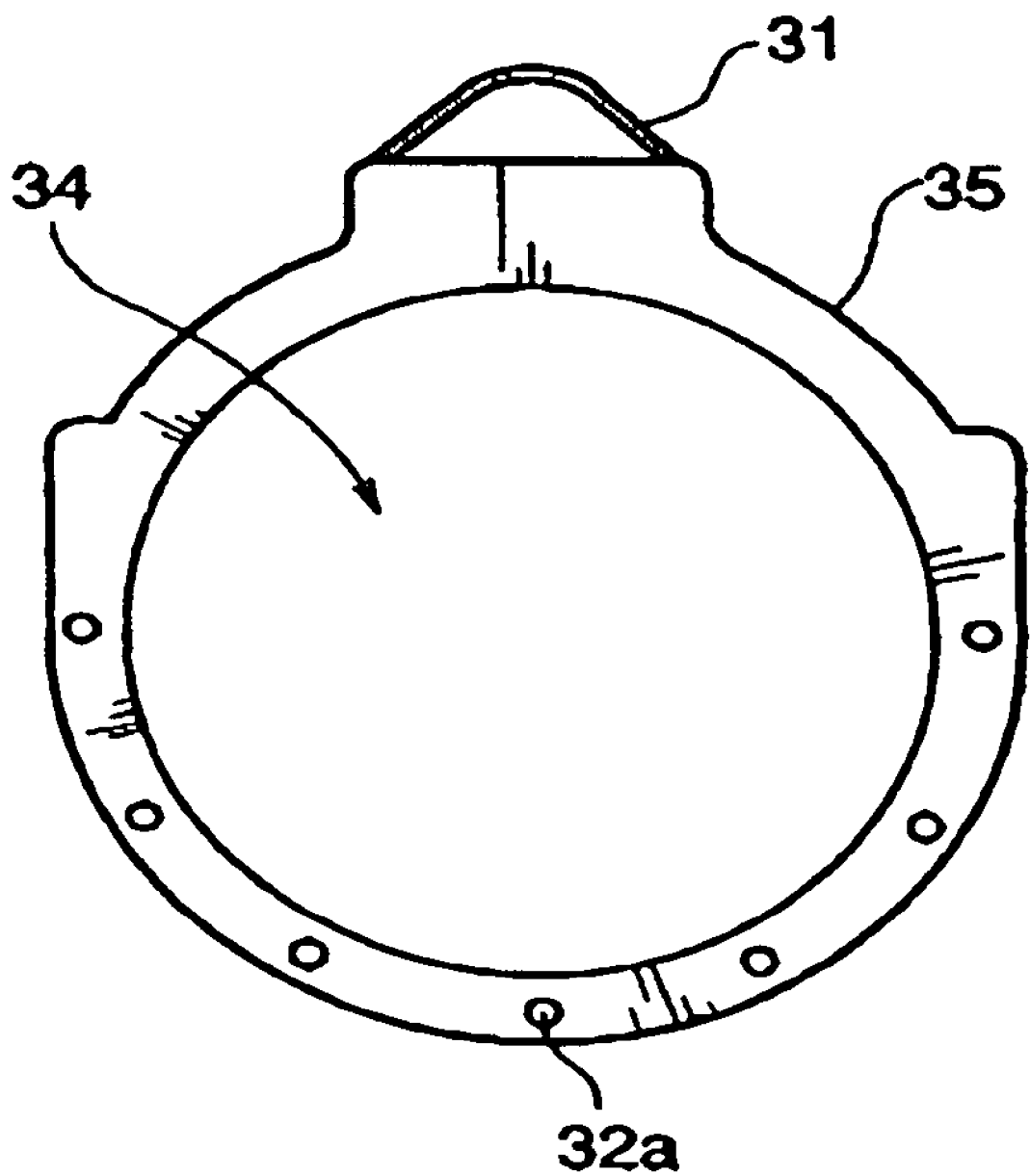
FIG. 8 is a front view showing a shape of a ring plate held between the joining portions of the flanges.

Incidentally, in an ordinary operation condition, a ring plate 35 which is provided with an opening portion 34 corresponding to an opening portion 33 (refer to FIG. 6B) of the exhaust pipe 3 and has an outer shape substantially same as the partitioning plate 26, is inserted in the clearance portion 28 between the flanges 27 and 27, as shown in FIG. 8. As a result, it is possible to purify the exhaust emission discharged by the operation of the engine 1, which passes through the exhaust pipe 3 from the exhaust manifold 2, via the respective catalytic converters disposed on halfway of the inside of the exhaust pipe 3, to thereby discharge the exhaust gas after being purified into the atmosphere via an end exhaust port of the exhaust pipe 3.

Further, to the partial exhaust pipe 24, as shown in FIG. 5, there are disposed the feed port 21 for feeding the washing water to an upper wall portion thereof, and the drain port 22 for draining the washing water to a bottom wall portion thereof. As a result, it is possible to feed the washing water from the feed port 21 at the washing time and to dissolve the deposited component of urea into the washing water, to thereby drain and remove the deposited component from the drain port 22.

Next, there will be described an operation of the exhaust emission purifying apparatus for the engine configured as in the above. At the time of ordinary running of the on-moving vehicle, the ring plate 35 shown in FIG. 8 is inserted in the clearance portion 28 between the opposite flanges 27. Then, both upper end side faces of the flanges 27 are held between the lock means 30 to be locked, so that the ring plate 35 is held in a locked state. As a result, the exhaust emission discharged by the operation of the engine 1 passes through the exhaust pipe 3 from the exhaust manifold 2 without leaking out of the clearance portion 28, via the oxidation catalytic converter 4, the reduction catalytic converter 5 for $NO_x$ and the oxidation catalytic converter 6 for ammonia-slip, which are disposed on halfway of the exhaust pipe 3, to be discharged into the atmosphere from the end exhaust port of the exhaust pipe 3.

At this time, the urea water is injected from the injection nozzle 7 disposed on the exhaust upstream side of the reduction catalytic converter 5 for $NO_x$ in the exhaust pipe 3. To the injection nozzle 7, the urea water is supplied from the storage tank 9 via the supply piping 10 and the reduction agent supply device 8, and the urea water is injection-supplied to the exhaust emission together with the pressurized air due to the operation of the reduction agent supply device 8. The urea water injected in such a manner is hydrolyzed due to the exhaust heat and the water vapor in the exhaust emission, to generate ammonia. Then, ammonia reacts to $NO_x$ in the exhaust emission in the reduction catalytic converter 5 to purify $NO_x$ into the harmless substance.

At this time, in the case where the temperature of the exhaust emission from the engine 1 is lower than the predetermined temperature, for example, 132° C., urea in the urea water injection-supplied from the injection nozzle 7 into the exhaust pipe 3 may be deposited on an inner wall face of the partial exhaust pipe 24 for example, to be attached thereto. In such a case, according to the second aspect of the present invention, deposited urea is appropriately washed to be removed.

Next, there will be described a method of washing to remove deposited urea. Firstly, the lock means 30 are detached from the joining portions of the opposite flanges 27, to release the locked state of the flanges 27. Next, in the case where the ring plate 35 is fastened to the flanges 27 by means of the screw bolts and nuts, these screw bolts and nuts are removed, to thereby detach the ring plate 35 from the clearance portion 28 between the opposite flanges 27.

Thereafter, the partitioning plate 26 shown in FIG. 7 is inserted in the clearance portion 28 between the opposite flanges 27. Then, the lock means 30 are latched on the outer side faces of the joining portions of the flanges 27, to thereby hold and lock the joining portions of the flanges 27. As a result, the partitioning plate 26 is held between the opposite flanges 27, to block between the first catalyst incorporating muffler 23 and the partial exhaust pipe 24, and between the partial exhaust pipe 24 and the second catalyst incorporating muffler 25. Note, in addition to the locking by the lock means 30, the partitioning plate 26 and the opposite flanges 27 may be combined together by means of the screw bolts and nuts via the combining holes 32a and 32b.

In this condition, the feed port 21 disposed on the upper wall portion of the partial exhaust pipe 24 is opened. At this time, the drain port 22 is kept in a closed state. Next, the washing water (for example, the water or the like) is supplied from the feed port 21 into the partial exhaust pipe 24 until the washing water is filled. As a result, it is possible to dissolve urea which is deposited to be attached to the inner wall face of the partial exhaust pipe 24, into the washing water, to thereby remove deposited urea. Thereafter, the drain port 22 disposed on the bottom wall portion of the partial exhaust pipe 24 is opened to thereby drain the washing water into which urea is dissolved, and the washing is terminated.

Incidentally, in the case where the washing water is fed into the partial exhaust pipe 24, the washing water may be fed in a state where the drain port 22 is opened. In this case, it is preferable that the drain port 22 is formed to have a diameter smaller than that of the feed port 21, so that a drained water amount is less than a fed water amount. As a result, even in the state where the drain port is opened, it is possible to fill the washing water in the partial exhaust pipe 24, and also it is possible to perform the washing while performing the feeding and draining of the washing water at the same time. Therefore, the washing efficiency is improved.

Thus, according to this embodiment, at the washing time, the partial exhaust pipe 24 provided with the injection nozzle 7 is blocked, by means of the partitioning plate 26, from the first and second catalyst incorporating mufflers 23 and 25, each provided with the catalytic converter disposed therein. Therefore, there is no possibility that the washing water is leaked out toward the first and second catalyst incorporating mufflers 23 and 25 sides to wet or degrade the respective catalytic converters.

Further, at the normal running time, the ring plate 35 on which the opening portion 34 is formed corresponding to the opening portion 33 of the exhaust pipe 3, is inserted in the clearance portion 28 disposed in the joining portions of the opposite flanges 27, so that a passage for the exhaust emission can be surely formed, while at the washing time, the partitioning plate 26 is inserted into the clearance portion 28, so that the exhaust pipe 3 can be blocked. Therefore, when the inside of the exhaust pipe 3 is washed, only the ring plate 35 may be exchanged to the partitioning plate 26, and therefore, the wash working becomes easy.

Incidentally, in this embodiment, the description has been made taking, as an example, the exhaust emission purifying apparatus provided with the oxidation catalytic converter 4 on the exhaust upstream side of the exhaust pipe 3. However, the present invention is not limited thereto, and can be applied to an exhaust emission purifying apparatus which is not provided with the oxidation catalytic converter 4. In this case, the partitioning plate 26 is not limited to be disposed on two positions on the exhaust upstream and downstream sides of the injection nozzle 7, and may be disposed between the partial exhaust pipe 24 at which the supplied reducing agent is deposited, and the second catalyst incorporating muffler 25 disposed therein with at least the reduction catalytic converter 5. Further, the washing water is not limited to the water, and may be appropriately selected according to the reducing agent to be used.

Figure 9:
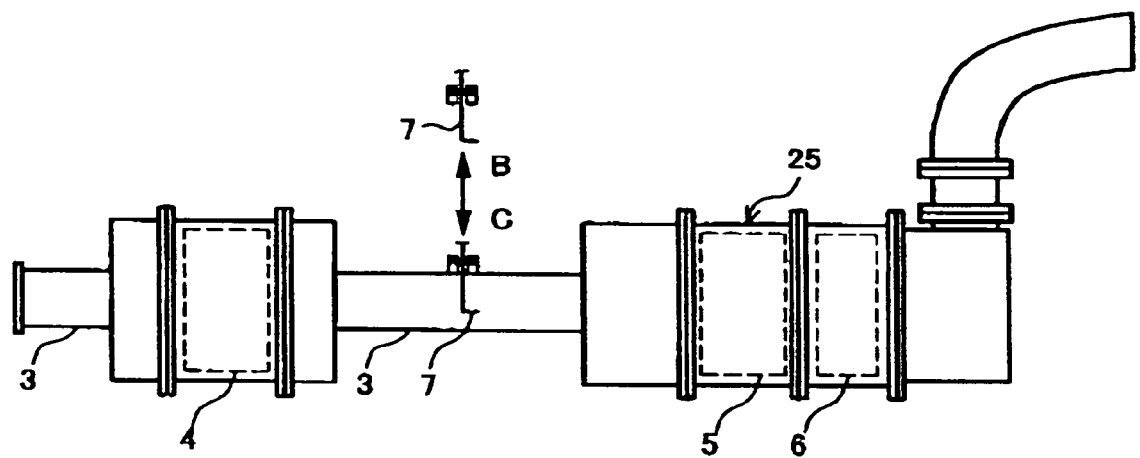
FIG. 9 is an enlarged main part explanatory diagram showing an embodiment of the exhaust emission purifying apparatus for the engine according to a third aspect of the present invention, for explaining a state where a portion of the exhaust pipe, to which a reducing agent is attached, is made detachable.

FIG. 9 is an enlarged explanatory view of a main part of an embodiment of the exhaust emission purifying apparatus for the engine according to a third aspect of the present invention. In this embodiment, a portion to which the reducing agent (urea water) injection-supplied from the injection nozzle 7 is attached in the exhaust pipe 3, is made to have a detachable structure.

To be specific, as shown in FIG. 9, as the portion to which the urea water is attached, the injection nozzle 7 in itself is made detachable from the exhaust pipe 3. As a result, when it is judged that urea contained in the urea water is deposited in the injection nozzle 7 which directly injects the urea water in the exhaust pipe 3, it is possible to detach the injection nozzle 7 in itself in an arrow "B" direction. Then, it is possible to wash the detached injection nozzle 7 with the water or the like, to remove the component (urea) of the reducing agent, which is deposited in the nozzle tip end portion or the like.

Thereafter, the injection nozzle 7 which has been detached to be washed, is attached to the original position in an arrow "C" direction, so that the exhaust emission pressure of the engine 1 is returned to an ordinary condition, in a state where urea deposited in the nozzle tip end portion or the like is removed, and therefore, the degradation of engine power can be prevented. At this time, in FIG. 9, it is unnecessary to detach the catalyst incorporating muffler 25 including the reduction catalytic converter 5 disposed in the exhaust pipe 3 of the engine 1, and only the detached injection nozzle 7 may be washed. Therefore, it is possible to simply perform the wash working for removing the deposited reducing agent component.

Figure 10:
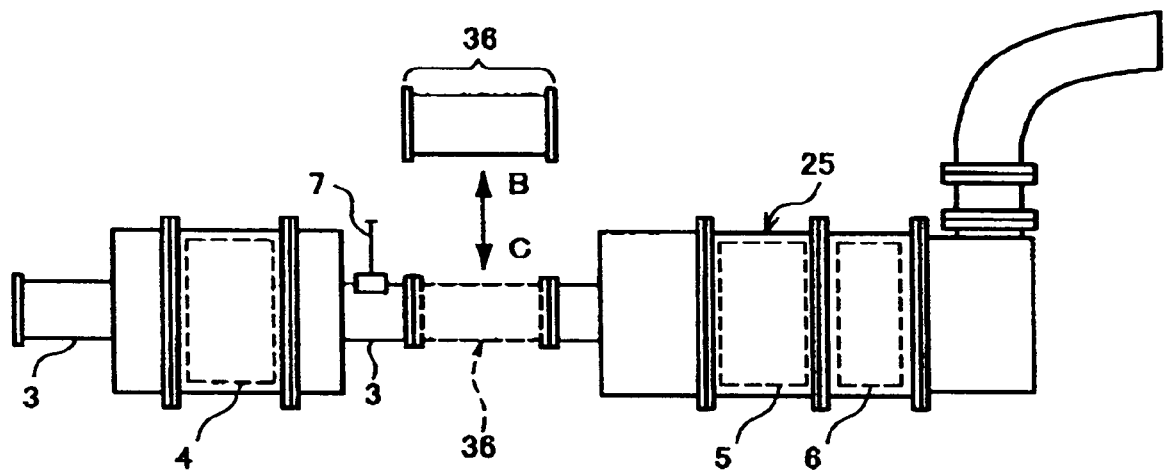
FIG. 10 is a main part explanatory diagram showing a second embodiment of the structure in which the reducing agent attached portion in the exhaust pipe, is made detachable.

FIG. 10 is an explanatory view showing a main part of a second embodiment of the structure in which the reducing agent (urea water) attached portion in the exhaust pipe 3 is constructed to be detachable as required. In this embodiment, as the portion to which the urea water is attached, a nozzle downstream side portion 36 of the exhaust pipe 3, which extends by the predetermined length from the vicinity of the exhaust downstream side of the injection nozzle, may be dismounted from the assembled condition. As a result, when it is considered that the urea water is attached to the vicinity of the exhaust downstream side of the injection nozzle 7 in the exhaust pipe 3, it is possible to dismount the nozzle downstream side portion 36 in the arrow "B" direction. Then, it is possible to wash the detached nozzle downstream side portion 36 with the water or the like, to remove deposited urea on the inner wall or the like of the exhaust pipe 3.

Thereafter, the detached and washed nozzle downstream side portion 36 is mounted to the original position in the arrow "C" direction, so that the exhaust emission pressure of the engine 1 is returned to the ordinary condition, in a state where the urea water attached to the inner wall or the like of the exhaust pipe 3 is removed, and therefore, the degradation of engine power can be prevented. Also at this time, it is unnecessary to detach the catalyst incorporating muffler 25 in FIG. 10, and only the detached nozzle downstream side portion 36 may be washed. Therefore, it is possible to simply perform the wash working for removing the deposited reducing agent component.

Figure 11:
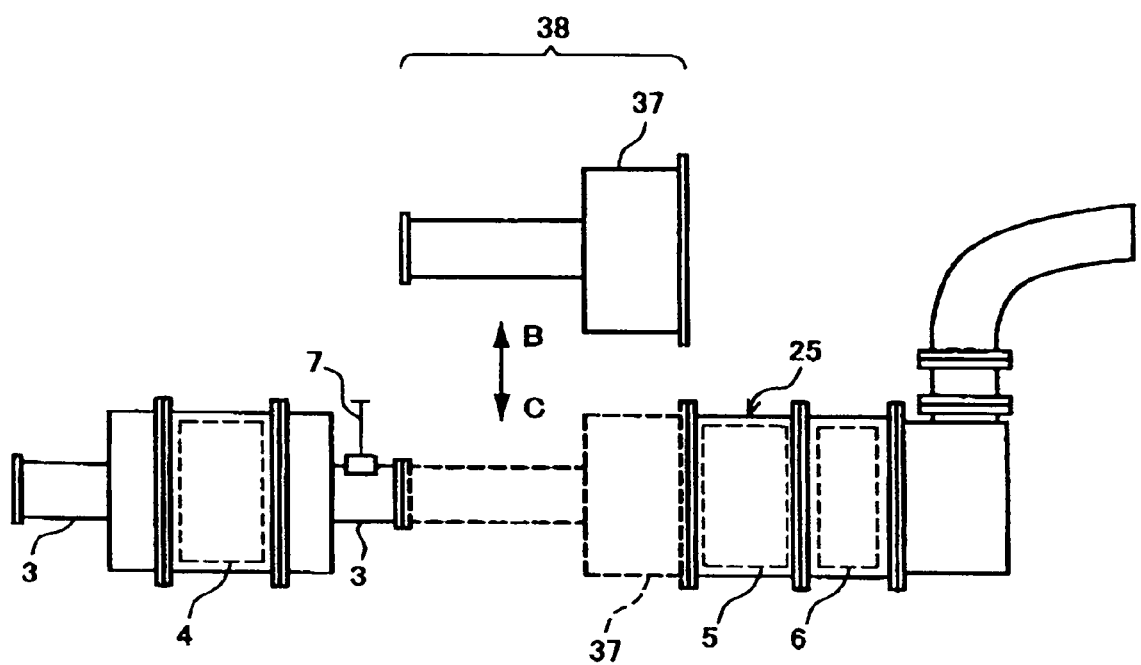
FIG. 11 is a main part explanatory diagram showing a third embodiment of the structure in which the reducing agent attached portion in the exhaust pipe, is made detachable.

FIG. 11 is an explanatory and diagrammatic view showing a main part of a third embodiment of the structure in which the reducing agent (urea water) attached portion in the exhaust pipe 3 is constructed to be detachable. In this embodiment, as the portion to which the urea water is attached, a nozzle downstream side portion 38 of the exhaust pipe 3, which extends from the vicinity of the exhaust downstream side of the injection nozzle 7 to the vicinity 37 of an inlet portion of the reduction catalytic converter 5, may be detached as required. As a result, when it is considered that the urea water impinges upon the vicinity 37 of the inlet portion of the reduction catalytic converter 5 on the exhaust downstream side of the injection nozzle 7 in the exhaust pipe 3, to be attached to the portion to which the urea water is susceptible to be attached, it is possible to detach the nozzle downstream side portion 38 in the arrow "B" direction. Then, it is possible to wash the detached nozzle downstream side portion 38 with the water or the like, to remove urea deposited on the inner wall or the like of the exhaust pipe 3.

Thereafter, the detached and washed nozzle downstream side portion 38 is re-attached to the original position in the arrow "C" direction, so that the exhaust emission pressure of the engine 1 is returned to the ordinary condition, in the state where the urea water attached to the inner wall or the like of the exhaust pipe 3 is removed, and therefore, the degradation of engine power can be prevented. Also at this time, it is unnecessary to detach the catalyst incorporating muffler 25 in FIG. 11, and only the detached nozzle downstream side portion 38 may be washed. Therefore, it is possible to simply perform the wash working for removing the deposited reducing agent component.

Figure 12:
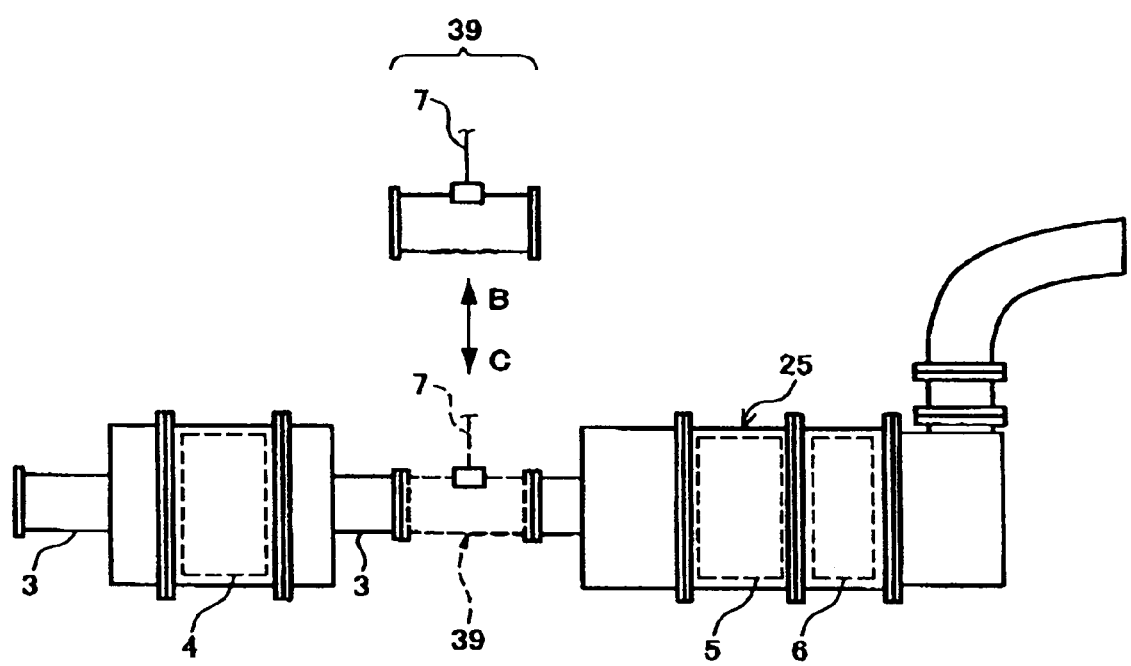
FIG. 12 is a main part explanatory diagram showing a fourth embodiment of the structure in which the reducing agent attached portion in the exhaust pipe, is made detachable.

FIG. 12 is an explanatory and diagrammatic view showing a main part of a fourth embodiment of the structure in which the reducing agent (urea water) attached portion in the exhaust pipe 3 is constructed to be detachable as required. In this embodiment, as the portion to which the urea water is attached, a nozzle front and rear portion 39 of the exhaust pipe 3, which extends by the predetermined length on the exhaust downstream side from the vicinity of the exhaust downstream side of the injection nozzle 7, is detachably mounted. As a result, when it is considered that the urea water is attached to the injection nozzle 7 and also to the vicinity of the exhaust downstream side of the injection nozzle 7 in the exhaust pipe 3, it is possible to detach the nozzle front and rear portion 39 in the arrow "B" direction. Then, it is possible to wash the detached nozzle front and rear portion 39 with the water or the like, to remove urea deposited on the inner wall or the like of the exhaust pipe 3.

Thereafter, the detached and washed nozzle front and rear portion 39 is re-mounted to the original position in the arrow "C" direction, so that the exhaust emission pressure of the engine 1 is returned to the ordinary condition, in the state where the urea water attached to the inner wall or the like of the exhaust pipe 3 is removed, and therefore, the degradation of engine power can be prevented. Also at this time, it is unnecessary to detach the catalyst incorporating muffler 25 in FIG. 12, and only the detached nozzle front and rear portion 39 may be washed. Therefore, it is possible to simply perform the wash working for removing the deposited reducing agent component. Note, in the embodiment shown in FIG. 12, the injection nozzle 7 may be made detachable from the detachable nozzle front and rear portion 39, to detach the injection nozzle 7 in itself to wash it with the water or the like.

Figure 13:
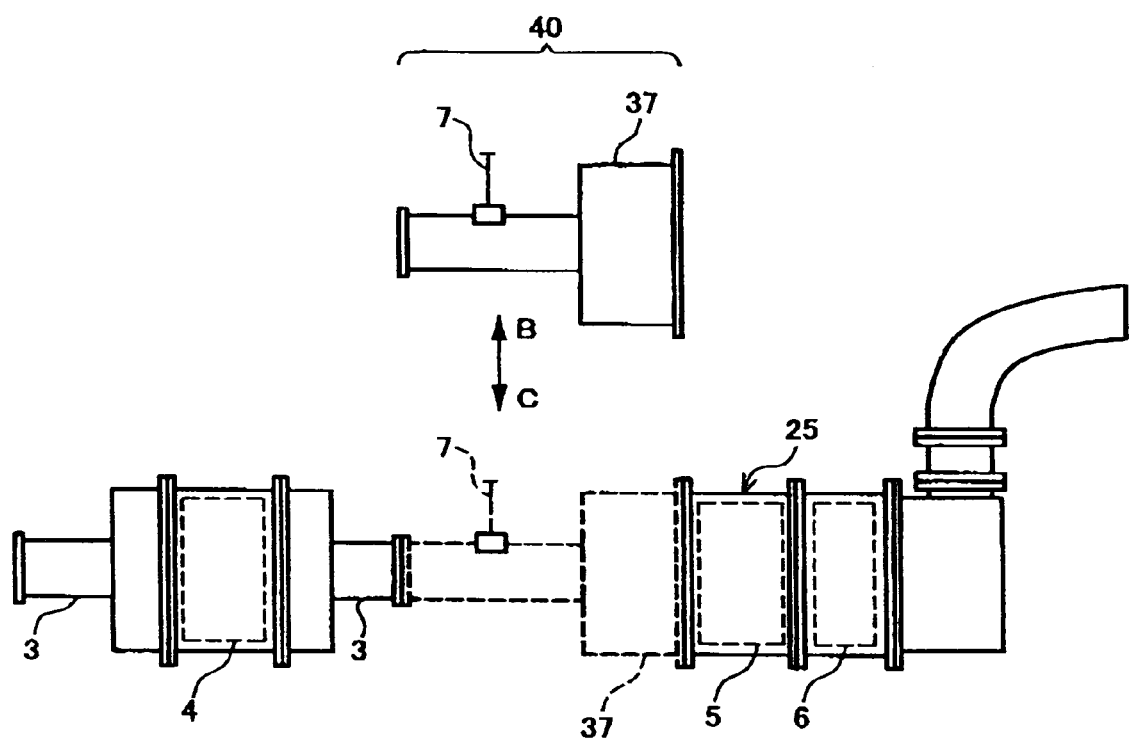
FIG. 13 is a main part explanatory diagram showing a fifth embodiment of the structure in which the reducing agent attached portion in the exhaust pipe, is made detachable.

FIG. 13 is an explanatory and diagrammatic view showing a main part of a fifth embodiment of the structure in which the reducing agent (urea water) attached portion in the exhaust pipe 3 is constructed to be detachable. In this embodiment, as the portion to which the urea water is attached, a nozzle front and rear portion 40 of the exhaust pipe 3, which extends from the vicinity of the exhaust downstream side of the injection nozzle to the vicinity 37 of the inlet portion of the reduction catalytic converter 5, may be detached as required. As a result, when it is considered that the urea water impinges upon the injection nozzle 7 and also upon the vicinity 37 of the inlet portion of the reduction catalytic converter 5 on the exhaust downstream side of the injection nozzle 7 in the exhaust pipe 3, to be attached to the portion to which the urea water is susceptible to be attached, it is possible to detach the nozzle front and rear portion 40 in the arrow "B" direction. Then, it is possible to wash the detached nozzle front and rear portion 40 with the water or the like, to remove urea deposited on the inner wall or the like of the exhaust pipe 3.

Thereafter, the detached and washed nozzle front and rear portion 40 is attached to the original position in the arrow "C" direction, so that the exhaust emission pressure of the engine 1 is returned to the ordinary condition. In the state where the urea water attached to the inner wall or the like of the exhaust pipe 3 is removed, and therefore, the degradation of engine power can be prevented. Also at this time, it is unnecessary to detach the catalyst incorporating muffler 25 in FIG. 13, and only the detached nozzle front and rear portion 40 may be washed. Therefore, it is possible to simply perform the wash working for eliminating the deposited reducing agent components. Note, also in the embodiment shown in FIG. 13, the injection nozzle 7 may be disassembled from the detachable nozzle front and rear portion 40, to take out the injection nozzle 7 in itself to wash it with the water or the like.

Figure 14:
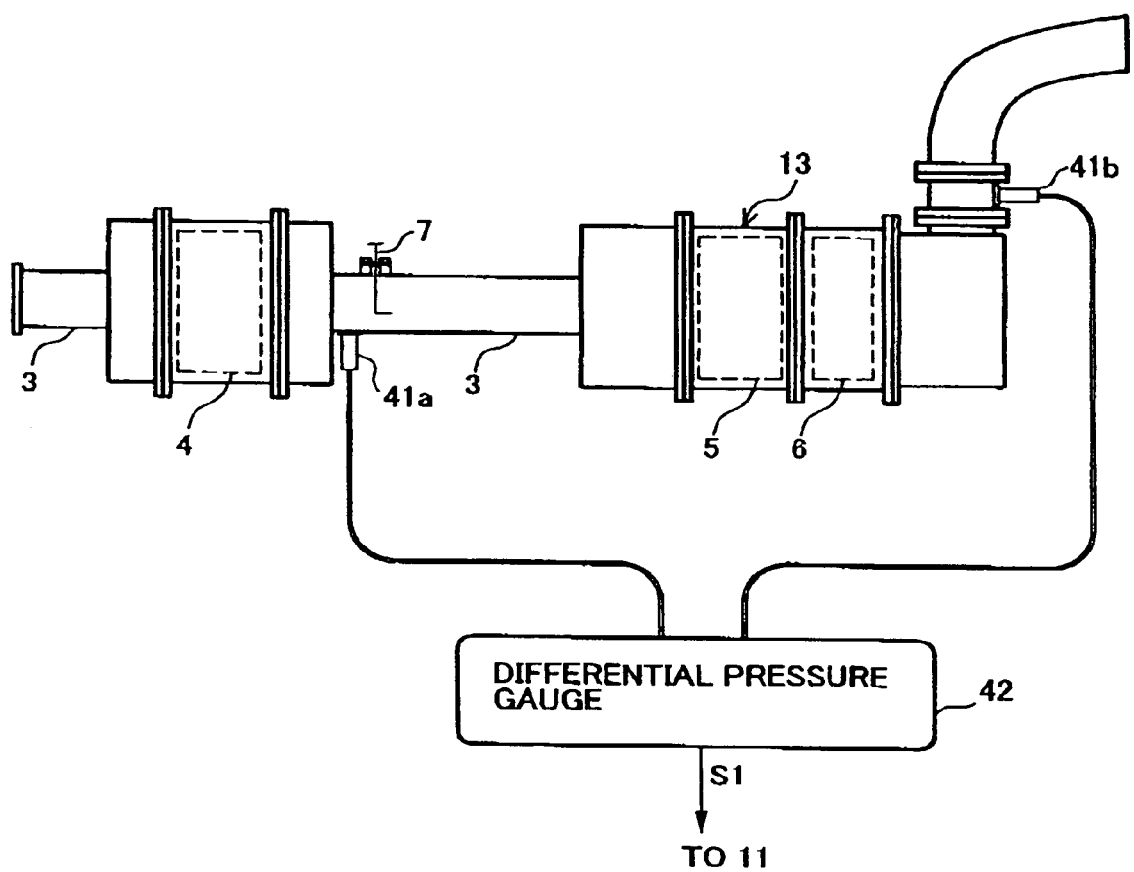
FIG. 14 is a main part explanatory diagram showing a further embodiment of the exhaust emission purifying apparatus.

FIG. 14 is an explanatory and diagrammatic view showing a main part of another embodiment of the exhaust emission purifying apparatus. In this embodiment, there are provided deposition detecting means for detecting that the reducing agent (urea water) supplied into the exhaust pipe 3 from the injection nozzle 7 is attached to be deposited in the exhaust pipe 3, and alarm means for alarming of the attachment deposition of the reducing agent based on a detection signal from the deposition detecting means.

The deposition detecting means is for measuring an exhaust emission pressure difference between the exhaust upstream side of the injection nozzle 7 and a downstream side of the site where the reducing agent component (urea) is deposited on the exhaust downstream side of the injection nozzle 7, to detect the deposition of the reducing agent component, and includes: a first pressure sensor 41a disposed on the exhaust upstream side of the injection nozzle 7 in the passage of the exhaust pipe 3; a second pressure sensor 41b disposed on the exhaust downstream side; and a differential pressure gauge 42 for measuring a difference between the exhaust emission pressures detected by the first and second pressure sensors 41a and 41b. Then, the pressure difference measured by the differential pressure gauge 42 is compared with a pressure difference at the ordinary operation time, and when a difference between the pressure differences is equal to or larger than a fixed value, it is detected that the reducing agent component is deposited, so that a detection signal $S_1$ is sent out to the ECU 11 shown in FIG. 1.

Further, the alarm means is for alarming based on the detection signal $S_1$ output from the differential pressure gauge 42 that the reducing agent component is deposited in the exhaust pipe 3, and as shown in FIG. 1, is comprised of an alarming device 43 using sound or light for example, and is connected to the ECU 11 via a signal line 44. As a result, it is possible to detect by the differential pressure gauge 42 that the reducing agent supplied into the exhaust pipe 3 from the injection nozzle 7 is attached to be deposited in the exhaust pipe 3, and to input the detection signal $S_1$ to alarm a driver or the like of the attachment deposition of the reducing agent by the alarming device 43. Accordingly, it is possible to urge the driver or the like to wash the portion of the exhaust pipe 3, at which the component of the reducing agent is deposited.

Incidentally, in FIG. 14, the second pressure sensor 41b is disposed on the latter stage of the oxidation catalytic converter 6 for ammonia-slip in the exhaust system. However, the present invention is not limited thereto, and the second pressure sensor 41b may be disposed on the prior stage of the reduction catalytic converter 5 for $NO_x$ for example. Further, in the description in FIG. 14 and FIG. 1, the detection signal $S_1$ from the differential pressure gauge 42 is supplied to the ECU 11, and the alarming device 43 is connected to the ECU 11 via the signal line 44. However, the alarming device 43 may be directly connected to the differential pressure gauge 42. Furthermore, the embodiment of FIG. 14 may be applied to the embodiments shown in FIG. 9 through FIG. 13.

Note, in the above description, the urea water is used as the reducing agent. However, the present invention is not limited thereto, and even in the case where a light oil, a gasoline or alcohol is used, it is possible to eliminate the component of the reducing agent, such as carbon or the like, which is deposited in the exhaust pipe 3, similarly to the above.

We claim:

1. An exhaust emission purifying apparatus for an engine comprising:
    a first oxidation catalytic converter disposed in an exhaust system of the engine, for reducing nitrogen monoxide in exhaust emission by an oxidation reaction;
    a reduction catalytic converter disposed in said exhaust system of the engine, for reductively purifying nitrogen oxides in exhaust emission with a reducing agent;
    a second oxidation catalytic converter for ammonia-slip disposed on a latter stage of said reduction catalytic converter in said exhaust system;
    an injection nozzle disposed within an exhaust passage of said exhaust system, for injection-supplying the reducing agent to an upstream side of a flow of exhaust emission with respect to the reduction catalytic converter within an exhaust passage of said exhaust system from a downstream side of the flow of exhaust emission with respect to said first oxidation catalytic converter; and
    a reducing agent supply device which supplies the reducing agent to the injection nozzle,
    wherein the exhaust passage is provided, in an inner wall of a lower portion thereof, with a recess portion by concaving a given site to which at least the reducing agent injection-supplied via the injection nozzle is attached, and
    wherein the recess portion has a bottom wall thereof configured to be detachably assembled.

2. The apparatus according to claim 1, wherein said recess portion has a width thereof taken in a horizontal direction along an axial direction of the exhaust passage, the width being substantially the same as a width of the exhaust passage taken in a horizontal direction.

3. The apparatus according to claim 1, wherein a bent portion arranged to extend substantially vertically downward along an exhaust gas flow direction and thereafter to be bent toward a substantially horizontal direction is disposed to an exhaust passage portion extending between the injection nozzle and the reduction catalytic converter, and wherein the recess portion is formed by concaving an inner wall of a lower portion of the bent portion.

4. The apparatus according to claim 1, wherein a heater is provided on a bottom wall of the recess portion for heating the bottom wall up to at least a fusion point of a component of the reducing agent or above.

5. The apparatus according to claim 4, wherein a thermal insulating material is disposed on an outer face side of the heater for suppressing heat radiation from the heater to the atmosphere.

6. An exhaust emission purifying apparatus for an engine comprising:
    a first oxidation catalytic converter disposed in an exhaust system of the engine, for reducing nitrogen monoxide in exhaust emission by an oxidation reaction;
    a reduction catalytic converter disposed in said exhaust system of the engine, for reductively purifying nitrogen oxides in exhaust emission with a reducing agent;
    a second oxidation catalytic converter for ammonia-slip disposed on a latter stage of said reduction catalytic converter in said exhaust system;
    an injection nozzle disposed within an exhaust passage of said exhaust system, arranged for injection-supplying the reducing agent to an upstream side of the exhaust emission flow with respect to the reduction catalytic converter within an exhaust passage of the exhaust system from a downstream side of the exhaust emission flow with respect to said first oxidation catalytic converter; and
    a reducing agent supply device arranged for supplying the reducing agent to the injection nozzle,
    wherein the apparatus further comprises blocking means which is detachably disposed for blocking an exhaust passage portion between a portion of the exhaust passage, to which the reducing agent injection-supplied from said injection nozzle is attached, and another portion of the exhaust passage, on which at least said reduction catalytic converter is disposed, and a feed port for feeding washing water and a drain port for drainage of the washing water are provided on a wall portion of the exhaust passage at the portion to which said reducing agent is attached.

7. The apparatus according to claim 6, wherein the blocking means is disposed on each of an upstream side position of the exhaust emission flow and a downstream side position of the exhaust emission flow with the injection nozzle therebetween in the exhaust system.

8. The apparatus according to claim 6, wherein the blocking means comprises a partitioning plate that is inserted to cross the exhaust passage from an insertion opening portion formed on a part of joining portions at which flanges disposed on a connecting portion on a halfway of the exhaust system are joined together to be opposite to each other, and the partitioning plate is held to be sandwiched between the joining portions of the flanges.

9. The apparatus according to claim 8, wherein said blocking means is provided with a lock means disposed in the vicinity of the insertion opening portion of said flange joining portions and latched on outer faces of the flanges to be secured in an inserted state between said flanges.

10. The apparatus according to claim 6, wherein the feed port for the washing water is disposed on an upper wall portion of the exhaust passage, and the drain port for the washing water is disposed on a bottom wall portion of the exhaust passage.

11. An exhaust emission purifying apparatus for an engine comprising:
    a first oxidation catalytic converter disposed in an exhaust system of the engine, for reducing nitrogen monoxide in exhaust emission by an oxidation reaction;
    a reduction catalytic converter disposed in said exhaust system of the engine, for reductively purifying nitrogen oxides in exhaust emission with a reducing agent;
    a second oxidation catalytic converter for ammonia-slip disposed on a latter stage of said reduction catalytic converter in said exhaust system;
    an injection nozzle disposed within an exhaust passage of said exhaust system, arranged for injection-supplying the reducing agent to an upstream side of the exhaust emission flow with respect to the reduction catalytic converter within an exhaust passage of the exhaust system from a downstream side of the exhaust emission flow with respect to said first oxidation catalytic converter; and
    a reducing agent supply device arranged for supplying the reducing agent to the injection nozzle,
    wherein the apparatus is further provided with a detachable structure formed in the exhaust passage at a portion thereof to which the reducing agent injection-supplied from said injection nozzle is attached.

12. The apparatus according to claim 11, wherein the portion to which the reducing agent is attached in the exhaust passage is configured by said injection nozzle, said injection nozzle being arranged to be mounted on but detachable from the exhaust passage.

13. The apparatus according to claim 11, wherein the portion to which the reducing agent is attached in the exhaust passage, is a given portion of the exhaust passage, which extends by a predetermined length from the vicinity of the injection nozzle on the downstream side of the exhaust emission flow, said given portion of the exhaust passage is configured to be detachable.

14. The apparatus according to claim 11, wherein the portion to which the reducing agent is attached in the exhaust passage, is a given portion of the exhaust passage, which extends from the vicinity of the injection nozzle on the downstream side of the exhaust emission flow to the vicinity of an inlet portion of said reduction catalytic converter, said given portion of the exhaust passage is configured to be detachable.

15. The apparatus according to claim 11, wherein the portion to which the reducing agent is attached in the exhaust passage, is a given portion of the exhaust passage, which extends by a predetermined length from the vicinity of said injection nozzle on an upstream side of the exhaust emission flow toward a downstream side of the exhaust emission flow, said given portion of said exhaust passage is configured to be detachable.

16. The apparatus according to claim 11, wherein the portion to which the reducing agent is attached in the exhaust passage, is a given portion of the exhaust passage, which extends from the vicinity of said injection nozzle on an upstream side of the exhaust emission flow to the vicinity of an inlet portion of said reduction catalytic converter, said given portion of the exhaust passage is configured to be detachable.

17. The apparatus according to claim 15, wherein said injection nozzle is configured to be detachable from the given portion of the exhaust passage that is per se configured to be detachable.

18. The apparatus according to claim 11, further comprising:

deposition detecting means for detecting that the reducing agent supplied from said injection nozzle into the exhaust passage is attached due to depositing thereof onto the inside of the exhaust passage; and alarm means for alarming of the attachment deposition of the reducing agent based on a detection signal from the deposition detecting means.

19. The apparatus according to claim 18, wherein the deposition detecting means is configured to measure an exhaust emission pressure difference between the upstream side of said injection nozzle along the exhaust emission flow and a downstream side of a site where the reducing agent is attached to be deposited on the downstream side of said injection nozzle, to thereby detect the attachment of the reducing agent due to deposition thereof.

* * * * *